US011989847B2

(12) United States Patent
Rong et al.

(10) Patent No.: US 11,989,847 B2
(45) Date of Patent: May 21, 2024

(54) PHOTOREALISTIC IMAGE SIMULATION WITH GEOMETRY-AWARE COMPOSITION

(71) Applicant: UATC, LLC, Mountain View, CA (US)

(72) Inventors: Frieda Rong, Toronto (CA); Yun Chen, Toronto (CA); Shivam Duggal, Toronto (CA); Shenlong Wang, Toronto (CA); Xinchen Yan, San Mateo, CA (US); Sivabalan Manivasagam, Toronto (CA); Ersin Yumer, Burlingame, CA (US); Raquel Urtasun, Toronto (CA)

(73) Assignee: UATC, LLC, Mountain View, CA (US)

( * ) Notice: Subject to any disclaimer, the term of this patent is extended or adjusted under 35 U.S.C. 154(b) by 0 days.

(21) Appl. No.: 17/668,577

(22) Filed: Feb. 10, 2022

(65) Prior Publication Data
US 2022/0165043 A1 May 26, 2022

Related U.S. Application Data

(63) Continuation of application No. 17/150,989, filed on Jan. 15, 2021, now Pat. No. 11,551,429.
(Continued)

(51) Int. Cl.
G06T 19/20 (2011.01)
G01B 11/22 (2006.01)
(Continued)

(52) U.S. Cl.
CPC .............. G06T 19/20 (2013.01); G01B 11/22 (2013.01); G01S 17/89 (2013.01); G01S 17/931 (2020.01); G06N 3/04 (2013.01); G06N 3/08 (2013.01); G06T 3/0093 (2013.01); G06T 7/521 (2017.01); G06T 15/20 (2013.01); G06T 17/10 (2013.01);
(Continued)

(58) Field of Classification Search
None
See application file for complete search history.

(56) References Cited

U.S. PATENT DOCUMENTS 8,616,883 B2    12/2013 Wokurka
9,183,676 B2    11/2015 McCulloch et al.
(Continued)

OTHER PUBLICATIONS

Tallavajhula et al, "Off-Road Lidar Simulation with Data Driven Terrain Primitives", International Conference on Robotics and Automation, May 21-25, 2018, Brisbane, Australia, 8 pages.
(Continued)

Primary Examiner — Andrew G Yang
(74) Attorney, Agent, or Firm — Dority & Manning, P.A.

(57) ABSTRACT

The present disclosure provides systems and methods for generating photorealistic image simulation data with geometry-aware composition for testing autonomous vehicles. In particular, aspects of the present disclosure can involve the intake of data on an environment and output of augmented data on the environment with the photorealistic addition of an object. As one example, data on the driving experiences of a self-driving vehicle can be augmented to add another vehicle into the collected environment data. The augmented data may then be used to test safety features of software for a self-driving vehicle.

14 Claims, 11 Drawing Sheets

Related U.S. Application Data

(60) Provisional application No. 63/093,471, filed on Oct. 19, 2020, provisional application No. 63/035,573, filed on Jun. 5, 2020.

(51) Int. Cl.
| | |
|---|---|
| *G01S 17/89* | (2020.01) |
| *G01S 17/931* | (2020.01) |
| *G06N 3/04* | (2023.01) |
| *G06N 3/08* | (2023.01) |
| *G06T 3/00* | (2006.01) |
| *G06T 7/521* | (2017.01) |
| *G06T 15/20* | (2011.01) |
| *G06T 17/10* | (2006.01) |
| *G06T 19/00* | (2011.01) |

(52) U.S. Cl.
CPC .. *G06T 19/006* (2013.01); *G06T 2207/10028* (2013.01); *G06T 2207/20084* (2013.01); *G06T 2207/30252* (2013.01); *G06T 2210/12* (2013.01); *G06T 2210/21* (2013.01); *G06T 2219/2004* (2013.01)

(56) References Cited

U.S. PATENT DOCUMENTS

| | | | |
|---|---|---|---|
| 9,286,725 | B2 | 3/2016 | Vasquez, II et al. |
| 10,311,312 | B2 | 6/2019 | Yu et al. |
| 10,382,799 | B1* | 8/2019 | Walters ............... G06F 16/248 |
| 10,552,689 | B2 | 2/2020 | Doria et al. |
| 10,654,476 | B2 | 5/2020 | Wray et al. |
| 10,885,710 | B2* | 1/2021 | Holz .................... H04N 13/271 |
| 2017/0061625 | A1* | 3/2017 | Estrada ................... G06T 7/75 |
| 2017/0115387 | A1 | 4/2017 | Luders et al. |
| 2017/0200310 | A1* | 7/2017 | Kapinos ................ G06T 15/20 |
| 2018/0089899 | A1 | 3/2018 | Piemonte |
| 2018/0136651 | A1* | 5/2018 | Levinson ............. B60W 30/00 |
| 2018/0211128 | A1 | 7/2018 | Hotson |
| 2018/0275658 | A1* | 9/2018 | Iandola ................ G06F 18/241 |
| 2018/0285663 | A1* | 10/2018 | Viswanathan ......... G06V 20/63 |
| 2018/0349526 | A1 | 12/2018 | Atsmon |
| 2018/0359416 | A1 | 12/2018 | Hold-Geoffroy et al. |
| 2019/0051052 | A1 | 2/2019 | Corazza |
| 2019/0329768 | A1 | 10/2019 | Shalev-Shwartz et al. |
| 2019/0354643 | A1 | 11/2019 | Shum |
| 2019/0384309 | A1 | 12/2019 | Silva et al. |
| 2019/0392642 | A1* | 12/2019 | Uberti .................. G06T 15/506 |
| 2020/0033880 | A1 | 1/2020 | Kehl |
| 2020/0106965 | A1* | 4/2020 | Malia ..................... G11B 27/34 |
| 2020/0117953 | A1* | 4/2020 | Cooper ................. G06F 18/214 |
| 2020/0151958 | A1* | 5/2020 | Livneh .................... G06T 5/008 |
| 2020/0218910 | A1* | 7/2020 | Herman ................. G06V 20/20 |
| 2020/0293778 | A1* | 9/2020 | Elliott ................... G06F 3/0304 |
| 2020/0301799 | A1* | 9/2020 | Manivasagam ........ G06N 3/047 |
| 2020/0394842 | A1 | 12/2020 | Baillard et al. |
| 2021/0019946 | A1 | 1/2021 | Sonasath et al. |
| 2021/0027470 | A1* | 1/2021 | Lin ........................... G06T 7/10 |
| 2021/0183343 | A1 | 6/2021 | Beith |
| 2021/0286923 | A1* | 9/2021 | Kristensen .............. G06F 30/27 |

OTHER PUBLICATIONS

Amini et al, "Learning Robust Control Policies for End-to-End Autonomous Driving From Data-Driven Simulation", Robotics and Automation Letters, vol. 5 No. 2, Apr. 2020, pp. 1143-1150.

Dosovitskiy et al, "CARLA: An Open Urban Driving Simulator", arXiv:1711.03938v1, Nov. 10, 2017, 16 pages.

Geiger, et al, "Vision Meets Robotics: The KITTI Dataset", International Journal of Robotics Research, vol. 32, Issue 11, Aug. 23, 2013, pp. 1231-1237.

Nealen et al, "Laplacian Mesh Optimization", Association for Computer Machinery, 2006, pp. 381-389.

Kanazawa et al, "Learning Category-Specific Mesh Reconstruction from Image Collections", arXiv:1803.07549v2, Jul. 30, 2018, 21 pages.

United States Department of Transportation, "Automated Vehicles for Safety", Apr. 2020, https://www.nhtsa.gov/technology-innovation/automated-vehicles-safety, retrieved on May 11, 2022, 12 pages.

Yang et al, "High-Resolution Image Inpainting using Multi-Scale Neural Patch Synthesis", arXiv:1611.09969v2, Apr. 13, 2017, 9 pages.

Qi et al, "PointNet: Deep Learning on Point Sets for 3D Classification and Segmentation", arXiv:1612.00593v2, Apr. 10, 2017, 19 pages.

Lin et al, "ST-GAN: Spatial Transformer Generative Adversarial Networks for Image Compositing", arXiv:1803.01837v1, Mar. 5, 2018, 13 pages.

Güera et al, "Deepfake Video Detection Using Recurrent Neural Networks" International Conference on Advanced Video and Signal Based Surveillance, Nov. 27-30, 2018, Auckland, New Zealand, 6 pages.

Kingma et al, "Adam: A Method for Stochastic Optimization", arXiv:1412.6980v9, Jan. 30, 2017, 15 pages.

Lee et al, "Context-Aware Synthesis and Placement of Object Instances", In Advances in Neural Information Processing Systems, 2018, 11 pages.

Epic Games, Unreal engine, The World's Most Open and Advanced Real-Time 3D Creation Tool, https://www.unrealengine.com, retrieved on May 11, 2022, 4 pages.

Kolve et al, "AI2-THOR: An Interactive 3D Environment for Visual AI" arXiv:1712.05474v3, Mar. 15, 2019, 4 pages.

Coumans et al, "Pybullet", GitHub repository, 2016.

Park et al, "Transformation-Grounded Image Generation Network for Novel 3D View Synthesis", arXiv:1703.02921v1, Mar. 8, 2017, 17 pages.

Xia et al, "Gibson Env: Real-World Perception for Embodied Agents", arXiv:1808.10654v1, Aug. 31, 2018, 12 pages.

Ros et al, "The Synthia Dataset: A Large Collection of Synthetic Images for Semantic Segmentation of Urban Scenes", Conference on Computer Vision and Pattern Recognition, Jun. 26-Jul. 1, 2016, Las Vegas, Nevada, United States, pp. 3234-3243, 2016.

Alhaija et al, "Augmented Reality Meets Computer Vision: Efficient Data Generation for Urban Driving Scenes", arXiv: 1708.01566v1, Aug. 4, 2017, 12 pages.

Kato, "Neural 3D Mesh Renderer", arXiv:1711.07566v1, Nov. 20, 2017, 17 pages.

Caesar et al, "nuScenes: A Multimodal Dataset for Autonomous Driving", arXiv:1903.11027v5, May 5, 2020, 16 pages.

Gonzales et al, "Autonomous Drifting with Onboard Sensors" Advanced Vehicle Control, 2017, pp. 133-138.

Jens Schulz, Constantin Hubmann, Julian Löchner, and Darius Burschka. Interaction-Aware Probabilistic Behavior Prediction in Urban Environments. arXiv:1804.10467 [cs], Aug. 2018. URL http://arxiv.org/abs/1804.10467. arXiv: 1804.10467.

Yu et al, "Free-Form Image Inpainting with Gated Convolution", arXiv:1806.03589v2, Oct. 22, 2019, 17 pages.

Fang et al, "Augmented LiDAR Simulator for Autonomous Driving", arXiv:1811.07112v2, Apr. 10, 2019, 10 pages.

Pearson. Neuroscience, The Human Imagination: The Cognitive Neuroscience of Visual Mental Imagery. vol. 20, No. 10, Oct. 2019, pp. 624-634.

Zhu et al, "Unpaired Image-to-Image Translation Using Cycle-Consistent Adversarial Networks", arXiv:1703.10593v7, Aug. 24, 2020, 18 pages.

Zhu et al, "Visual Object Networks: Image Generation with Disentangled 3D Representation", arXiv:1812.02725v1, Dec. 6, 2018, 12 pages.

Johnson et al, "Image Generation from Scene Graphs", arXiv:1804.01622v1, Apr. 4, 2018, 16 pages.

Johnson et al, "Perceptual Losses for Real-Time Style Transfer and Super-Resolution", arXiv:1603.08155v1, Mar. 27, 2016, 18 pages.

He et al, "Mask R-CNN", arXiv:1703.06870v3, Jan. 24, 2018, 12 pages.

(56) References Cited

OTHER PUBLICATIONS

Bousmalis et al, "Using Simulation and Domain Adaptation to Improve Efficiency of Deep Robotic Grasping", arXiv:1709.07857v2, Sep. 25, 2017, 9 pages.
Savva et al, "Habitat: A Platform for Embodied AI Research", arXiv:1904.01201v2, Nov. 25, 2019, 17 pages.
Savva et al, "MINOS: Multimodal Indoor Simulator for Navigation in Complex Environments", arXiv:1712.03931v1, Dec. 11, 2017, 14 pages.
Martinez et al, "Beyond Grand Theft Auto V for Training, Testing and Enhancing Deep Learning in Self Driving Cars", arXiv:1712.01397v1, Dec. 4, 2017, 15 pages.
Heusel et al, "GANs Trained by a Two Time-Scale Update Rule Converge to a Local Nash Equilibrium", arXiv:1706.08500v6, Jan. 12, 2018, 38 pages.
Jaderberg et al, "Spatial Transformer Networks", arXiv:1506.02025v3, Feb. 4, 2016, 15 pages.
Chang et al, "Argoverse: 3D Tracking and Forecasting with Rich Maps", Conference on Computer Vision and Pattern Recognition, Jun. 16-20, 2019, Long Beach, California, United States, pp. 8748-8757.
Hedman et al, "Deep Blending for Free-Viewpoint Image-Based Rendering" Association for Computing Machinery, vol. 37, No. 6, Article 257, Nov. 2018, 15 pages.
Isola et al, "Image-to-Image Translation with Conditional Adversarial Networks", arXiv:1611.07004v3, Nov. 26, 2018, 17 pages.
Chen et al, "Photographic Image Synthesis with Cascaded Refinement Networks", arXiv:1707.09405v1, Jul. 28, 2017, 10 pages.
Mo et al, "InstaGAN: Instance-Aware Image-to-Image Translation" arXiv:1812.10889v2, Jan. 2, 2019, 26 pages.
Hong et al, "Inferring Semantic Layout for Hierarchical Text-to-Image Synthesis" arXiv:1801.05091v2, Jul. 26, 2018, 15 pages.
Hong et al, "Learning Hierarchical Semantic Image Manipulation through Structured Representations", arXiv:1808.07535v2, Aug. 28, 2018, 18 pages.
Sun et al, "Multiview to Novel View: Synthesizing Novel Views with Self-learned Confidence", European Conference on Computer Vision, Sep. 8/14, 2018, Munich, Germany, 17 pages.
Liu et al, "Soft Rasterizer: A Differentiable Renderer for Image Based 3D Reasoning", arXiv:1904.01786v1, Apr. 3, 2019, 15 pages.
Manivasagam et al, "LiDARsim: Realistic LiDAR Simulation by Leveraging the World", arXiv:2006.09348v1, Jun. 16, 2020, 11 pages.
Richter, et al, "Playing for Data: Ground Truth from Computer Games", 1608.02192v1, Aug. 7, 2016, 16 pages.
Park et al, "Semantic Image Synthesis with Spatially-Adaptive Normalization", arXiv:1903.07291v2, Nov. 5, 2019, 19 pages.
Karras et al, "A Style-Based Generator Architecture for Generative Adversarial Networks", Conference on Computer Vision and Pattern Recognition, Jun. 16-20, 2019, Long Beach, California, United States, pp. 4401-4410.
Tewari et al, "State of the Art on Neural Rendering", arXiv:2004.03805v1, Apr. 8, 2020, 27 pages.
Wang et al, "High-Resolution Image Synthesis and Semantic Manipulation with Conditional GANs", arXiv:1711.11585v2, Aug. 20, 2018, 14 pages.
Zhou et al, View Synthesis by Appearance Flow. arXiv:1605.03557v3, Feb. 11, 2017, 16 pages.
Waymo Open Dataset: An autonomous driving dataset, 2019, retrieved on May 13, 2022, 5 pages.
Li et al, "AADS: Augmented Autonomous Driving Simulation using Data-driven Algorithms", Science Robotics, vol. 4, Mar. 27, 2019, 13 pages.
Chen et al, "Learning to Predict 3D Objects with an Interpolation-Based Differentiable Renderer", arXiv:1908.01210v2, Nov. 21, 2019, 11 pages.
World Health Organization, "Global Status Report on Road Safety", Jun. 17, 2018, 424 pages.
Qi et al., "Parametric Image Synthesis" arXiv:1804.10992v1, Apr. 29, 2018, 9 pages.
Wang et al, "Generative Image Modeling Using Style and Structure Adversarial Networks", arXiv:1603.05631v2, Jul. 26, 2016, 22 pages.
Zhou "Objects as points", arXiv:1904.07850v2, Apr. 25, 2019, 12 pages.
Chen et al "Monocular Neural Image Based Rendering with Continuous View Control", arXiv:1901.01880v2, Sep. 9, 2019, 11 pages.
Li et al, "Putting Humans in a Scene: Learning Affordance in 3D Indoor Environments", arXiv:1903.05690v2, Mar. 15, 2019, 14 pages.
Xiong et al, UPSNet: A Unified Panoptic Segmentation Network. arXiv:1901.03784v2, Apr. 3, 2019, 15 pages.
Yang et al, SurfelGAN: Synthesizing Realistic Sensor Data for Autonomous Driving. arXiv:2005.03844v2, Jun. 25, 2020, 16 pages.

\* cited by examiner

PHOTOREALISTIC IMAGE SIMULATION WITH GEOMETRY-AWARE COMPOSITION

RELATED APPLICATIONS

This application claims priority to and the benefit of each of U.S. patent application Ser. No. 17/150,989, filed Jan. 15, 2021; U.S. Provisional Patent Application No. 63/035,573, filed Jun. 5, 2020 and U.S. Provisional Patent Application No. 63/093,471, filed Oct. 19, 2020, all of which are hereby incorporated by reference in their entirety.

FIELD

The present disclosure relates generally to the application of machine learning to image simulation. More particularly, the present disclosure relates to systems and methods that generate synthetic, geometrically-realistic image data using real world data.

BACKGROUND

The field of autonomous vehicles includes the design, construction, operation, and application of autonomous vehicles, as well as computer systems for their control, sensory feedback, information processing, and testing. In many cases, autonomous vehicle software can be tested by testing the software on pre-recorded data. However, pre-recorded data can be expensive to obtain. Obtaining data for autonomous vehicle testing can include expensive data recording equipment, labor costs, and heavy time consumption.

Physics-based renderings have been shown to be particularly advantageous for creating visually appealing, photorealistic results. However, physics-based renderings are known to require a significant amount of computing resources, costly manual asset creation, and physical modeling, and therefore, can be costly and resource consuming. Furthermore, images produced by real-time rendering engines have a significant realism gap that reduces their impact in robot simulation. In particular, many past image synthesis approaches do not leverage or account for an underlying realistic three-dimensional (3D) world, and as a consequence, the generated two-dimensional (2D) contents are not directly useful for applications such as robot simulation.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for generating simulated imagery. The method can include obtaining environment data descriptive of an environment, wherein the environment data comprises one or more images of the environment from a viewpoint. The method may include determining an insertion location for a simulated object within the environment based at least in part on the environment data. In some implementations, the method may include accessing an object bank to obtain object data for the simulated object, and generating, based at least in part on the environment data, the object data, and the insertion location, occlusion data that describes one or more features of the environment that occlude the simulated object at the insertion location when viewed from the viewpoint. The method may include augmenting, based at least in part on the object data, the insertion location, and the occlusion data, at least one of the one or more images of the environment to generate an initial augmented image that depicts from the viewpoint the simulated object at the insertion location and occluded by the one or more features of the environment. In some implementations, the method may include refining the initial augmented image with a machine-learned refinement model to generate a refined augmented image.

Another example aspect of the present disclosure is directed to a computing system for generation of synthetic imagery. The computing system can include one or more processors and one or more non-transitory computer-readable media that collectively store instructions that, when executed by the one or more processors, cause the computing system to perform operations. The operations may include obtaining one or more real world images collected from a viewpoint by one or more real world sensors of a first vehicle during operation of the first vehicle, wherein the one or more real world images depict an environment, and determining an insertion location for a simulated vehicle within the environment. In some implementations, the operations may include accessing an object bank to obtain object data for the simulated vehicle, wherein the object data for the simulated vehicle is derived from real world images and light detection and ranging data that depicts a real world vehicle, and wherein the real world images and light detection and ranging data were collected by one or more real world sensors of a second vehicle during operation of the second vehicle. The operations may include generating, based at least in part on the object data and the insertion location, an augmented image that depicts from the viewpoint the simulated vehicle at the insertion location.

Another example aspect of the present disclosure is directed to one or more non-transitory computer-readable media that store instructions that, when executed by a computing system, cause the computing system to perform operations for training object reconstruction. The operations can include obtaining, by the computing system, a first set of object data, wherein the first set of object data comprises image data, and a second set of object data, wherein the second set of object data comprises Light Detection and Ranging (LiDAR) point cloud data. The operations may include processing, by the computing system, the first set of object data with a first embedding model to generate a first feature embedding, and processing, by the computing system, the second set of object data with a second embedding model to generate a second feature embedding. The operations may include processing, by the computing system, the first feature embedding and the second feature embedding with a third embedding model to generate a three-dimensional mesh model of an object based at least in part on the first feature embedding and the second feature embedding. In some implementations, the operations may include generating, by the computing system, predicted image data based at least in part on the three-dimensional mesh model, wherein the predicted image data comprises a predicted reconstruction of the first set of object data, and generating, by the computing system, predicted point cloud data based at least in part on the three-dimensional mesh model, wherein the predicted point cloud data comprises a predicted reconstruction of the second set of object data. The operations may include evaluating, by the computing system, a loss function that compares the predicted image data and the predicted point cloud data with the first set of object data and the second set of object data, wherein the loss function comprises a silhouette loss and a Light Detection and Ranging (LiDAR) loss, wherein the silhouette loss compares a generated predicted silhouette based at least in part on the predicted image data against a generated ground truth silhouette based at least in part on the first set of object data, wherein the LiDAR loss compares vertices of the predicted point cloud data against a set of ground truth vertices data based at least in part on the second set of object data. In some implementations, the operations may include modifying, by the computing system, parameters of at least one of the first embedding model and the second embedding model based on the loss function.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
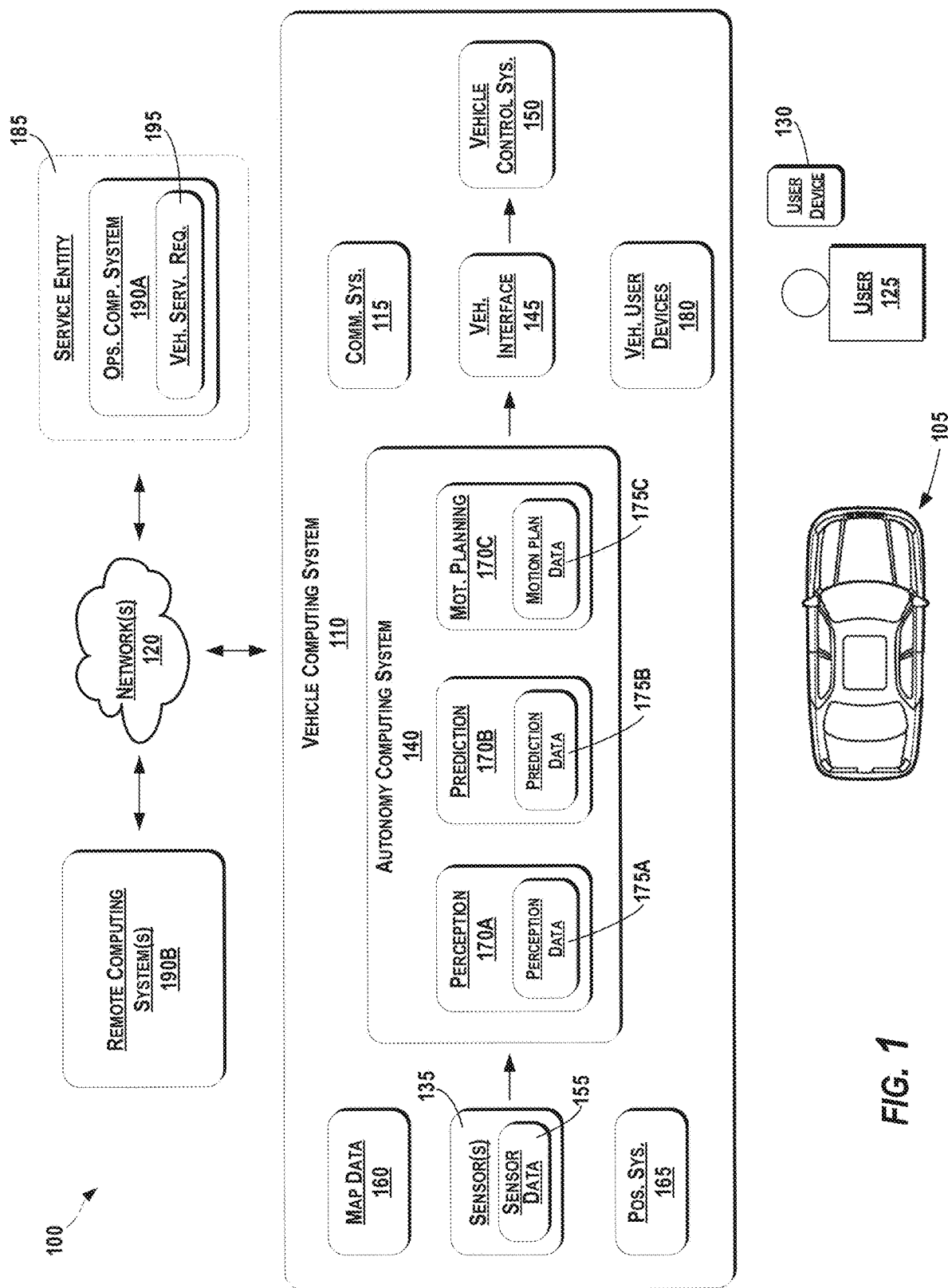
FIG. 1 depicts an example autonomous vehicle system according to example embodiments of the present disclosure.

Reference numerals that are repeated across plural figures are intended to identify the same features in various implementations.

DETAILED DESCRIPTION

Overview

Generally, the present disclosure describes systems and methods for performing geometry-aware image composition which synthesizes imagery (e.g., that depicts novel urban driving scenes) by augmenting existing images with dynamic objects extracted from other scenes and rendered at novel poses. In particular, one example aspect of the present disclosure is directed to systems and methods that build a diverse bank of 3D objects with both realistic geometry and appearance from sensor data. During simulation, example implementations of the present disclosure can perform a novel geometry-aware simulation-by-composition procedure which 1) proposes plausible and realistic object placements into a given scene, 2) renders novel views of dynamic objects from the asset bank, and 3) composes and blends the rendered image segments. The resulting synthetic images are photorealistic, physically plausible, and geometrically consistent, allowing image simulation to scale to complex use cases. In some implementations, both the data used to generate the inserted object and the imagery which is augmented by insertion of the object are or include real-world sensor data collected by sensors of a vehicle while it is operated in the real-world. This results in hyper-realistic synthetic imagery. Two example applications include: long-range realistic video simulation across multiple camera sensors, and synthetic labeled data generation for monocular 3D detection.

In particular, one example application for the system can be the generation of augmented image data to test autonomous vehicle software. The system or method may obtain environment data (e.g., video and/or LiDAR data) collected by an autonomous vehicle. The environment data may depict a driving environment in a city, town, or other driving area. The system or method may then determine an insertion location within the environment depicted in the environment data, in which a simulated vehicle may be placed. Based on the determined insertion location, the system or method can select an object, or a set of vehicle data, from an object bank to insert in the insertion location. Occlusion data may be generated by the system based on the environment data, object selected, and the insertion location. The occlusion data may include depth of vehicles in the environment or location of other environmental features such as moving and/or non-moving actors. The insertion location, selected object, and occlusion data can then be used to augment the environment data to generate augmented data (e.g., an augmented image that depicts the inserted object at the insertion location and, potentially, occluded by one or more of the environmental features). The augmented data may then be refined with a refinement model to generate refined augmented data with corrected texture and color saturation. The refined augmented data may be a new set of environment data (e.g., a synthetic image frame) with a novel vehicle not found in the initial environment data. The above-described process can be performed over a number of epochs (e.g., each image frame included in a video) to generate a sequence of augmented images (e.g., a synthetic video). The generated simulation data can provide more data to test autonomous vehicle software, and potentially provide more safety on the road.

More particularly as traffic accidents can lead to serious injuries, the need for safety on the road is evident. Advancements in self-driving vehicles can reduce the number of accidents caused by human-error. However, the software for self-driving vehicles needs to be tested before being released onto the roadways. Simulations on the self-driving, or autonomous vehicle, software can be run to test the safety of the software.

Simulations can include data collected from a city, town, or any driving route. Retrieval of the data can be time consuming, taxing on resources, and laborsome. However, autonomous vehicle safety testing can be aided by the generation of novel simulated imagery. An application that utilizes environment data such as camera-captured imagery and/or three-dimensional imaging and Light Detection and Ranging (LiDAR) data to generate synthetic data for autonomous vehicle testing can provide a larger database of road data to test the safety features of autonomous vehicle software. In particular, a system or method may take environment data and may place a new three-dimensional object in the image with adjusted occlusion and lighting. Occlusion may be determined by layer segmentation, which may be enabled in some instances by the LiDAR data. Furthermore, known preconceived actions can also be taken into account to ensure objects move naturally in the environment. After placement and occlusion of the object, the augmented image (e.g., including borders between the existing imagery and the inserted object) may be texturized or otherwise re-fined for a more realistic look.

In some implementations, the system or method may exploit 3D scene layout, for example from high-definition maps and/or LiDAR readings, to add objects (e.g., vehicles) in plausible locations and may make the vehicles behave realistically by considering the full scene. Example systems or methods can use the new 3D scene to perform image-based rendering to properly handle occlusions. The systems or methods may use the 3D scene to also perform neural network-based image inpainting to fill holes and/or fix inconsistent colors due to lighting changes. The systems or methods may utilize data-driven simulation techniques through large-scale automatic construction of realistic 3D assets, with the image-based rendering techniques in simulation engines. The utilization of the data-driven simulation techniques may enable scalable geometry-aware manipulation of urban driving scenes with photo-realistic camera simulation. In some implementations, the systems or methods may be used for realistic safety verification, data augmentation, augmented reality, automatic video editing, and/or other potential applications.

Example systems or methods for automated object insertion in images and videos may be enabled by the utilization of camera images, LiDAR point cloud data, lane data, and/or 3D bounding boxes. In particular, one example aspect of the present disclosure is directed to systems and methods that generate an object bank with object data for a number of objects (e.g., vehicles). An object bank may be automatically or manually generated by gathering LiDAR point cloud data on an object into a 3D bounding box. The 3D bounding boxes may then be projected on the image data to generate binary silhouettes and object's region of interest (ROI), for example, via an instance segmentation network. The object ROI and silhouettes may then be used to generate a 3D mesh. The generated data may then be stored in an object bank.

The 3D object bank may be utilized to insert new objects in preexisting environment data. The insertion may use the determination of insertion location, environmental movement vectors, and occlusion depths. The determined data may then be used to insert a new object into the environment data. The new augmented data may undergo texture synthesis to ensure the borders of the inserted object have a clean transition.

Example systems or methods for automated object insertion may automatically generate 3D assets from prerecorded sensor data (e.g., real world sensor data collected by sensors associated with a vehicle during operation of the vehicle) and may utilize the 3D assets to manipulate and simulate new images. The pre-recorded data may include camera image data, LiDAR point cloud data, both camera image data and LiDAR point cloud data, and/or other forms of sensor data. The pre-recorded data may also include 3D bounding boxes.

The pre-recorded data may be registered and stored in an object bank. The object bank may also store 3D object reconstruction data including but not limited to 3D meshes, captured and/or predicted images, and/or object poses in ego-vehicle-centric coordinates. Moreover, the object bank may include systems or methods for generating 3D meshes, predicted images, and object poses in ego-vehicle-centric coordinates.

A 3D mesh of an object for inclusion in the object bank may be generated by a trained system. A trained system may intake a first set of object data and a second set of object data. The first set of object data may be processed by a first embedding model to create a first feature embedding, and the second set of object data may be processed by a second embedding model to create a second feature embedding. The first feature embedding and second feature embedding may then be processed by a third embedding model to create a third feature embedding.

The first set of object data may be image data. The image data may be cropped data. The cropping may reflect a parameterized region of interest. The first embedding model may include a fully convolutional neural network. In some implementations, the first embedding model may include a U-Net architecture. The first embedding model may generate a plurality of first feature embeddings with each first feature embedding corresponding to an inputted image. The plurality of first feature embeddings may be a plurality of corresponding feature maps, and in some implementations, the plurality of first feature embeddings may be aggregated using max pooling to generate a one-dimensional latent representation. The one-dimensional latent representation may be used to generate a camera feature. Thus, in some implementations, a first embedding model may intake a first set of object data and may generate a camera feature embedding.

The second set of object data may be LiDAR point cloud data. The LiDAR point cloud data may be cropped data. The cropping may reflect a parameterized region of interest. The second embedding model may include a fully convolutional neural network. In some implementations, the second embedding model may include a PointNet architecture. The second embedding model may generate a plurality of second feature embeddings with each second feature embedding corresponding to an inputted LiDAR point cloud, and in some implementations, the plurality of second feature embeddings may be a plurality of corresponding feature maps. The plurality of second feature embeddings may be aggregated using pooling to generate a latent representation. The latent representation may be used to generate a LiDAR feature. Thus, in some implementations, a second embedding model may intake a second set of object data and may generate a LiDAR feature embedding.

The first feature embedding and the second feature embedding may be compared, concatenated, combined, and/ or otherwise processed by a third embedding model. The third embedding model may generate a third feature embedding based on the input of the first feature embedding and second feature embedding. In some implementations, the third embedding model may include a multilayer perceptron. The third feature embedding may be a 3D mesh (e.g., parameterized as a category-specific mean shape in a canonical pose with a 3D deformation per each vertex).

The first, second, and/or third embedding models may be trained by comparing predicted data to ground truth data with one or more loss functions. For example, the third feature embedding may be used to generate a predicted shape. The predicted shape or the third feature embedding may be used to render or generate a plurality of predicted images. In addition, the predicted shape or the third feature embedding may be used to generate one or more predicted 3D point clouds or predicted chamfers. The predicted images may be compared to the first set of object data, and the predicted 3D point cloud(s) may be compared to the second set of object data. The comparison may utilize one or more loss functions. The parameters of the first embedding model, second embedding model, and/or third embedding model may be modified in response to the evaluation of the predicted data by the loss function(s). In some implementations, the evaluation of the embedding models may include a silhouette loss, a LiDAR loss, and/or one or more regularization losses.

In particular, the silhouette loss can compare segmentation maps respectively generated from the predicted images and the first set of object data. Thus, evaluating the silhouette loss may include comparing a ground truth 2D silhouette to a silhouette of a 2D rendering of the predicted 3D shape. The ground truth 2D silhouette may be based at least in part on the first set of object data. The silhouette of a 2D rendering of the predicted 3D shape may be based at least in part on the third embedding feature.

The LiDAR loss may include comparing a ground truth 3D point cloud to the point cloud rendering of the predicted 3D shape. The comparison may include comparing the vertices of the point cloud rendering of the three-dimensional mesh model against a set of ground truth vertices based at least in part on the second set of object data.

The regularization loss may include edge regularization, normal regularization, and/or Laplacian regularization. Edge regularization may penalize long edges to prevent isolated vertices. The normal regularization may enforce smoothness of local surface normal. The Laplacian regularization may preserve local geometry and may prevent intersecting mesh faces.

Training of the system may begin with first gathering LiDAR point cloud data on an object into a 3D bounding box. The 3D bounding box may then be projected onto image data of the object corresponding to the gathered LiDAR point cloud data. The bounded LiDAR data and the cropped image data may then be inputted into an image segmentation network, which may output a region of interest (ROI) for the object and a silhouette of the object. The ROI and silhouette may be used to generate 3D meshes.

According to another aspect of the present disclosure, example systems or methods for automated object insertion may generate augmented data by inserting object data from the object bank into environment data. Environment data may be pre-existing data. Environment data may include camera video footage. Environment data may include LiDAR point clouds. Environment data may include lane graph maps. The environment data and the object bank may be processed to generate photo-realistic video with novel objects inserted into the scene. The inserted objects may interact with other dynamic agents in the scene.

A system or method for automated object insertion may begin with obtaining environment data (e.g., data descriptive of an environment such as camera-captured imagery, LiDAR point cloud, lane maps, etc.). In some implementations, the environment data can be or can include data that was captured by sensors of a vehicle (e.g., an autonomous vehicle) as the vehicle was operated in the real world. The environment data may be processed to determine or select a placement, or insertion location, for new objects in the environment data. The determination of an insertion location may include determining open spaces on a high-definition map. Thus, in some implementations, the insertion location may be a placement into or based on a high-definition map. The high-definition map may reflect traffic and a three-dimensional layout in a realistic manner. The selection or determination may be based at least in part on the determination of environmental feature movement in the environment data. Environment features may be cars or other objects in the videos, humans crossing the street in the video, or any other environmental actor or feature.

In particular, in some implementations, object placement processing and determination may include random sampling, retrieving lane orientations, and/or rejecting samples with resulting collisions. In some implementations, the first step of object placement determination may be randomly sampling placement possibilities from lane regions. The second step may be retrieving the lane orientation for each sample placement. The system or method may then process the sample placement with the placement's respective lane orientation to determine if the sample placement may cause a collision (e.g., with existing static and/or dynamic objects included in the environment). Any sample placement that may lead to a collision may be rejected. A collision may be an overlap of a sample placement and an environmental feature. A collision may be a sample placement that is counter to lane orientation.

After determination of an insertion location, the system or method may select or determine what object from the object bank to insert into the environment data. Selection or determination may use a scoring system to determine object data sets with the best fit.

In some implementations, the selection of object data from the object bank may include matching point of view and distance. The determination of object data may include processing the environment data with respect to the determined object placement to determine a target point of view and a target distance. The system or method may then select object data sets and source texture sets from the object bank. The selected object data sets may be refined based on viewpoints and distance. The object data sets and source textures may be scored based at least in part on overlap with target viewpoint and target distance. The scoring may be used to reject object data sets and source textures that may provide too much variance in viewpoint and distance, such that insertion does not meet a desired goal of photo-realism. In some implementations, object data sets may be sampled according to categorical distribution weighted by inverse score. Object data sets may be processed to determine if insertion of the object data set may lead to a collision if placed in selected insertion location. An object data set may be selected or determined by having the most target overlap without collision.

In some implementations, the system or method may include or perform view warping. View warping may alter reconstructed object data based on processed environment data. In some implementations, view warping may begin by rendering the selected object data's 3D mesh model at selected target viewpoint to generate the corresponding target depth. The rendered depth map of the object data set along with the source camera images may be used to generate the object's 2D texture map using an inverse warping operation.

After selecting an object data set, the system or method may generate occlusion mask layers. Occlusion mask layers may be generated by processing environment data to determine depths of environmental features. The determined depths may be used to generate occlusion masks. The occlusion masks may be compiled and organized into layers to generate occlusion mask layers. Furthermore, the depth of the object to be inserted may be determined (e.g., based on its insertion location). After depth of the object is determined, the object data may then be inserted into the environment data to generate an initial augmented image. In some implementations, the inserted object data may be occluded or partially obstructed based at least in part on the object's determined depth with respect to environmental features (e.g., features with relatively smaller depth from the viewpoint can occlude the inserted object while features with relatively larger depth may not occlude the object data).

In some implementations, the proposed systems or methods may use an occlusion reasoning model. The occlusion reasoning model may include projecting a LiDAR sweep corresponding to the target frame onto an image pane and interpolating the depths of environment features. The interpolation may be used to obtain the estimated depths to generate an estimated depth map of the image. The object data set may be processed to render the depth of the object. Occlusion masks may be rendered for environmental features. In some implementations, the occlusion masks may be rendered by evaluating if each pixel of the target image's depth is smaller than the object's corresponding pixel depth. The occlusion masks may be compiled to generate occlusion mask layers. In some implementations, object occlusion may be determined based at least in part on the occlusion mask layers.

After insertion, the initial augmented image may be processed by an image refinement model such as a neural network model. The image refinement model may perform inpainting or texture correction. Thus, in some implementations, texture synthesis or texture correction may be applied to the initial augmented image to generate a refined augmented image. Lighting correction may be one correction applied by the image refinement model to the initial augmented image.

Thus, in some implementations, the proposed systems or methods may include or perform a post-composition synthesis. The post-composition synthesis may include processing a target background image corresponding to the selected insertion location, a masked target object rendering corresponding to the selected object data set, and an object binary silhouette corresponding to the selected object set. Texture synthesis may be applied to smooth the transition from the inserted object data to the environment data. Lighting correction may be applied based at least in part on processing the target background image, masked target object rendering, and object binary silhouette. In some implementations, random occlusion, data augmentation, color jittering, random contract, and random saturation may be applied. The output of the post-composition synthesis may be a final image that naturally composites the background and rendered object.

In some implementations, the proposed systems or methods may include a dynamics model. The dynamics model may process the kinematics of the environment data and determine realistic actions for the object data when placed in the environment data to generate augmented data. For example, the dynamics model can enable realistic, smooth, and kinematically-realistic movement of the inserted object.

In some implementations, to train the image refinement model (e.g., prior to using the model to generate the synthetic imagery), example systems or methods may evaluate a refined augmented image generated by the model with a loss function. In some implementations, the loss function may be a perceptual loss function. In some implementations, the loss function may be a GAN loss function. The evaluation may use both a perceptual loss and a GAN loss. For example, one example perceptual loss is described in Johnson et al., Perceptual Losses for Real-Time Style Transfer and Super-Resolution, *CoRR* 2016. In one example GAN loss, the network can be judged on its ability to fool a discriminator model into judging that the refined imagery is real (e.g., when compared to actual real imagery). The model can be updated (e.g., parameter values adjusted) in response to the evaluation of the loss function(s).

Thus, example implementations of the present disclosure combine data-driven simulation techniques through large-scale automatic construction of realistic 3D assets, with image-based rendering techniques in simulation engines, enabling scalable geometry-aware manipulation of urban driving scenes with photo-realistic camera simulation.

Although particular focus is given to the use of the proposed systems and methods for generating synthetic imagery for use in training or evaluating autonomous vehicle computing systems, the system and methods disclosed herein can be applied to other industries outside of autonomous vehicles including, as examples, film making, other robotic simulation, augmented reality, and/or teleconferencing. The presently disclosed systems and methods may be applied to other industries for augmenting images and augmenting videos.

The systems and methods of the present disclosure provide a number of technical effects and benefits. As one example, the system and methods can provide for a larger sample of data to test autonomous vehicle software. The larger sample size of data may provide for safer autonomous vehicles software as the software may not need to be tested on the road until later in the development process. Furthermore, the systems or methods may preserve data collection costs as the systems or methods may lessen the need for camera and LiDAR data collection to provide for novel testing scenarios. The systems and methods may also reduce computing power needed to produce photo-realistic imagery, while also reducing the human labor needed to produce such imagery. In particular, physics-based renderings are known to require a significant amount of computing resources, costly manual asset creation, and physical modeling, and therefore, can be costly and resource consuming. In contrast, the proposed techniques are relatively more compute efficient, thereby conserving computing resources such as processor usage, memory usage, and/or network bandwidth.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

With reference now to the Figures, example embodiments of the present disclosure will be discussed in further detail.

Example Devices and Systems

FIG. 1 depicts a block diagram of an example system 100 for controlling and communicating with a vehicle according to example aspects of the present disclosure. As illustrated, FIG. 1 shows a system 100 that can include a vehicle 105 and a vehicle computing system 110 associated with the vehicle 105. The vehicle computing system 100 can be located onboard the vehicle 105 (e.g., it can be included on and/or within the vehicle 105).

The vehicle 105 incorporating the vehicle computing system 100 can be various types of vehicles. For instance, the vehicle 105 can be an autonomous vehicle. The vehicle 105 can be a ground-based autonomous vehicle (e.g., car, truck, bus, etc.). The vehicle 105 can be an air-based autonomous vehicle (e.g., airplane, helicopter, vertical take-off and lift (VTOL) aircraft, etc.). The vehicle 105 can be a light weight elective vehicle (e.g., bicycle, scooter, etc.). The vehicle 105 can be another type of vehicles (e.g., watercraft, etc.). The vehicle 105 can drive, navigate, operate, etc. with minimal and/or no interaction from a human operator (e.g., driver, pilot, etc.). In some implementations, a human operator can be omitted from the vehicle 105 (and/or also omitted from remote control of the vehicle 105). In some implementations, a human operator can be included in the vehicle 105.

The vehicle 105 can be configured to operate in a plurality of operating modes. The vehicle 105 can be configured to operate in a fully autonomous (e.g., self-driving) operating mode in which the vehicle 105 is controllable without user input (e.g., can drive and navigate with no input from a human operator present in the vehicle 105 and/or remote from the vehicle 105). The vehicle 105 can operate in a semi-autonomous operating mode in which the vehicle 105 can operate with some input from a human operator present in the vehicle 105 (and/or a human operator that is remote from the vehicle 105). The vehicle 105 can enter into a manual operating mode in which the vehicle 105 is fully controllable by a human operator (e.g., human driver, pilot, etc.) and can be prohibited and/or disabled (e.g., temporary, permanently, etc.) from performing autonomous navigation (e.g., autonomous driving, flying, etc.). The vehicle 105 can be configured to operate in other modes such as, for example, park and/or sleep modes (e.g., for use between tasks/actions such as waiting to provide a vehicle service, recharging, etc.). In some implementations, the vehicle 105 can implement vehicle operating assistance technology (e.g., collision mitigation system, power assist steering, etc.), for example, to help assist the human operator of the vehicle 105 (e.g., while in a manual mode, etc.).

To help maintain and switch between operating modes, the vehicle computing system 110 can store data indicative of the operating modes of the vehicle 105 in a memory onboard the vehicle 105. For example, the operating modes can be defined by an operating mode data structure (e.g., rule, list, table, etc.) that indicates one or more operating parameters for the vehicle 105, while in the particular operating mode. For example, an operating mode data structure can indicate that the vehicle 105 is to autonomously plan its motion when in the fully autonomous operating mode. The vehicle computing system 110 can access the memory when implementing an operating mode.

The operating mode of the vehicle 105 can be adjusted in a variety of manners. For example, the operating mode of the vehicle 105 can be selected remotely, off-board the vehicle 105. For example, a remote computing system (e.g., of a vehicle provider and/or service entity associated with the vehicle 105) can communicate data to the vehicle 105 instructing the vehicle 105 to enter into, exit from, maintain, etc. an operating mode. By way of example, such data can instruct the vehicle 105 to enter into the fully autonomous operating mode.

In some implementations, the operating mode of the vehicle 105 can be set onboard and/or near the vehicle 105. For example, the vehicle computing system 110 can automatically determine when and where the vehicle 105 is to enter, change, maintain, etc. a particular operating mode (e.g., without user input). Additionally, or alternatively, the operating mode of the vehicle 105 can be manually selected via one or more interfaces located onboard the vehicle 105 (e.g., key switch, button, etc.) and/or associated with a computing device proximate to the vehicle 105 (e.g., a tablet operated by authorized personnel located near the vehicle 105). In some implementations, the operating mode of the vehicle 105 can be adjusted by manipulating a series of interfaces in a particular order to cause the vehicle 105 to enter into a particular operating mode.

The vehicle computing system 110 can include one or more computing devices located onboard the vehicle 105. For example, the computing device(s) can be located on and/or within the vehicle 105. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 105 (e.g., its computing system, one or more processors, etc.) to perform operations and functions, such as those described herein for testing an autonomous vehicle, communicating with other computing systems, etc.

The vehicle 105 can include a communications system 115 configured to allow the vehicle computing system 110 (and its computing device(s)) to communicate with other computing devices. The communications system 115 can include any suitable components for interfacing with one or more network(s) 120, including, for example, transmitters, receivers, ports, controllers, antennas, and/or other suitable components that can help facilitate communication. In some implementations, the communications system 115 can include a plurality of components (e.g., antennas, transmitters, and/or receivers) that allow it to implement and utilize multiple-input, multiple-output (MIMO) technology and communication techniques.

The vehicle computing system 110 can use the communications system 115 to communicate with one or more computing device(s) that are remote from the vehicle 105 over one or more networks 120 (e.g., via one or more wireless signal connections). The network(s) 120 can exchange (send or receive) signals (e.g., electronic signals), data (e.g., data from a computing device), and/or other information and include any combination of various wired (e.g., twisted pair cable) and/or wireless communication mechanisms (e.g., cellular, wireless, satellite, microwave, and radio frequency) and/or any desired network topology (or topologies). For example, the network(s) 120 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communication network (or combination thereof) for transmitting data to and/or from the vehicle 105 and/or among computing systems.

In some implementations, the communications system 115 can also be configured to enable the vehicle 105 to communicate with and/or provide and/or receive data and/or signals from a remote computing device associated with a user 125 and/or an item (e.g., an item to be picked-up for a courier service). For example, the communications system 115 can allow the vehicle 105 to locate and/or exchange communications with a user device 130 of a user 125. In some implementations, the communications system 115 can allow communication among one or more of the system(s) on-board the vehicle 105.

As shown in FIG. 1, the vehicle 105 can include one or more sensors 135, an autonomy computing system 140, a vehicle interface 145, one or more vehicle control systems 150, and other systems, as described herein. One or more of these systems can be configured to communicate with one another via one or more communication channels. The communication channel(s) can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel(s).

The sensor(s) 135 can be configured to acquire sensor data 155. The sensor(s) 135 can be external sensors configured to acquire external sensor data. This can include sensor data associated with the surrounding environment of the vehicle 105. The surrounding environment of the vehicle 105 can include/be represented in the field of view of the sensor(s) 135. For instance, the sensor(s) 135 can acquire image and/or other data of the environment outside of the vehicle 105 and within a range and/or field of view of one or more of the sensor(s) 135. The sensor(s) 135 can include one or more Light Detection and Ranging (LIDAR) systems, one or more Radio Detection and Ranging (RADAR) systems, one or more cameras (e.g., visible spectrum cameras, infrared cameras, etc.), one or more motion sensors, one or more audio sensors (e.g., microphones, etc.), and/or other types of imaging capture devices and/or sensors. The one or more sensors can be located on various parts of the vehicle 105 including a front side, rear side, left side, right side, top, and/or bottom of the vehicle 105. The sensor data 155 can include image data (e.g., 2D camera data, video data, etc.), RADAR data, LIDAR data (e.g., 3D point cloud data, etc.), audio data, and/or other types of data. The vehicle 105 can also include other sensors configured to acquire data associated with the vehicle 105. For example, the vehicle 105 can include inertial measurement unit(s), wheel odometry devices, and/or other sensors.

In some implementations, the sensor(s) 135 can include one or more internal sensors. The internal sensor(s) can be configured to acquire sensor data 155 associated with the interior of the vehicle 105. For example, the internal sensor(s) can include one or more cameras, one or more infrared sensors, one or more motion sensors, one or more weight sensors (e.g., in a seat, in a trunk, etc.), and/or other types of sensors. The sensor data 155 acquired via the internal sensor(s) can include, for example, image data indicative of a position of a passenger or item located within the interior (e.g., cabin, trunk, etc.) of the vehicle 105. This information can be used, for example, to ensure the safety of the passenger, to prevent an item from being left by a passenger, confirm the cleanliness of the vehicle 105, remotely assist a passenger, etc.

In some implementations, the sensor data 155 can be indicative of one or more objects within the surrounding environment of the vehicle 105. The object(s) can include, for example, vehicles, pedestrians, bicycles, and/or other objects. The object(s) can be located in front of, to the rear of, to the side of, above, below the vehicle 105, etc. The sensor data 155 can be indicative of locations associated with the object(s) within the surrounding environment of the vehicle 105 at one or more times. The object(s) can be static objects (e.g., not in motion) and/or dynamic objects/actors (e.g., in motion or likely to be in motion) in the vehicle's environment. The sensor(s) 135 can provide the sensor data 155 to the autonomy computing system 140.

In addition to the sensor data 155, the autonomy computing system 140 can obtain map data 160. The map data 160 can provide detailed information about the surrounding environment of the vehicle 105 and/or the geographic area in which the vehicle was, is, and/or will be located. For example, the map data 160 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, and/or other traffic control devices); obstruction information (e.g., temporary or permanent blockages, etc.); event data (e.g., road closures/traffic rule alterations due to parades, concerts, sporting events, etc.); nominal vehicle path data (e.g., indicate of an ideal vehicle path such as along the center of a certain lane, etc.); and/or any other map data that provides information that assists the vehicle computing system 110 in processing, analyzing, and perceiving its surrounding environment and its relationship thereto. In some implementations, the map data 160 can include high definition map data. In some implementations, the map data 160 can include sparse map data indicative of a limited number of environmental features (e.g., lane boundaries, etc.). In some implementations, the map data can be limited to geographic area(s) and/or operating domains in which the vehicle 105 (or autonomous vehicles generally) may travel (e.g., due to legal/regulatory constraints, autonomy capabilities, and/or other factors).

The vehicle 105 can include a positioning system 165. The positioning system 165 can determine a current position of the vehicle 105. This can help the vehicle 105 localize itself within its environment. The positioning system 165 can be any device or circuitry for analyzing the position of the vehicle 105. For example, the positioning system 165 can determine position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the vehicle 105 can be used by various systems of the vehicle computing system 110 and/or provided to a remote computing system. For example, the map data 160 can provide the vehicle 105 relative positions of the elements of a surrounding environment of the vehicle 105. The vehicle 105 can identify its position within the surrounding environment (e.g., across six axes, etc.) based at least in part on the map data 160. For example, the vehicle computing system 110 can process the sensor data 155 (e.g., LIDAR data, camera data, etc.) to match it to a map of the surrounding environment to get an understanding of the vehicle's position within that environment. Data indicative of the vehicle's position can be stored, communicated to, and/or otherwise obtained by the autonomy computing system 140.

The autonomy computing system 140 can perform various functions for autonomously operating the vehicle 105. For example, the autonomy computing system 140 can perform the following functions: perception 170A, prediction 170B, and motion planning 170C. For example, the autonomy computing system 130 can obtain the sensor data 155 via the sensor(s) 135, process the sensor data 155 (and/or other data) to perceive its surrounding environment, predict the motion of objects within the surrounding environment, and generate an appropriate motion plan through such surrounding environment. In some implementations, these autonomy functions can be performed by one or more sub-systems such as, for example, a perception system, a prediction system, a motion planning system, and/or other systems that cooperate to perceive the surrounding environment of the vehicle 105 and determine a motion plan for controlling the motion of the vehicle 105 accordingly. In some implementations, one or more of the perception, prediction, and/or motion planning functions 170A, 170B, 170C can be performed by (and/or combined into) the same system and/or via shared computing resources. In some implementations, one or more of these functions can be performed via difference sub-systems. As further described herein, the autonomy computing system 140 can communicate with the one or more vehicle control systems 150 to operate the vehicle 105 according to the motion plan (e.g., via the vehicle interface 145, etc.).

The vehicle computing system 110 (e.g., the autonomy computing system 140) can identify one or more objects that within the surrounding environment of the vehicle 105 based at least in part on the sensor data 135 and/or the map data 160. The objects perceived within the surrounding environment can be those within the field of view of the sensor(s) 135 and/or predicted to be occluded from the sensor(s) 135. This can include object(s) not in motion or not predicted to move (static objects) and/or object(s) in motion or predicted to be in motion (dynamic objects/actors). The vehicle computing system 110 (e.g., performing the perception function 170C, using a perception system, etc.) can process the sensor data 155, the map data 160, etc. to obtain perception data 175A. The vehicle computing system 110 can generate perception data 175A that is indicative of one or more states (e.g., current and/or past state(s)) of one or more objects that are within a surrounding environment of the vehicle 105. For example, the perception data 175A for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape, object highlighting, etc.); class (e.g., pedestrian class vs. vehicle class vs. bicycle class, etc.), the uncertainties associated therewith, and/or other state information. The vehicle computing system 110 can utilize one or more algorithms and/or machine-learned model(s) that are configured to identify object(s) based at least in part on the sensor data 155. This can include, for example, one or more neural networks trained to identify object(s) within the surrounding environment of the vehicle 105 and the state data associated therewith. The perception data 175A can be utilized for the prediction function 175B of the autonomy computing system 140.

The vehicle computing system 110 can be configured to predict a motion of the object(s) within the surrounding environment of the vehicle 105. For instance, the vehicle computing system 110 can generate prediction data 175B associated with such object(s). The prediction data 175B can be indicative of one or more predicted future locations of each respective object. For example, the prediction system 175B can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 175B can be indicative of the speed and/or acceleration at which the respective object is predicted to travel along its associated predicted motion trajectory. The vehicle computing system 110 can utilize one or more algorithms and/or machine-learned model(s) that are configured to predict the future motion of object(s) based at least in part on the sensor data 155, the perception data 175A, map data 160, and/or other data. This can include, for example, one or more neural networks trained to predict the motion of the object(s) within the surrounding environment of the vehicle 105 based at least in part on the past and/or current state(s) of those objects as well as the environment in which the objects are located (e.g., the lane boundary in which it is travelling, etc.). The prediction data 175B can be utilized for the motion planning function 170C of the autonomy computing system 140.

The vehicle computing system 110 can determine a motion plan for the vehicle 105 based at least in part on the perception data 175A, the prediction data 175B, and/or other data. For example, the vehicle computing system 110 can generate motion planning data 175C indicative of a motion plan. The motion plan can include vehicle actions (e.g., speed(s), acceleration(s), other actions, etc.) with respect to one or more of the objects within the surrounding environment of the vehicle 105 as well as the objects' predicted movements. The motion plan can include one or more vehicle motion trajectories that indicate a path for the vehicle 105 to follow. A vehicle motion trajectory can be of a certain length and/or time range. A vehicle motion trajectory can be defined by one or more way points (with associated coordinates). The planned vehicle motion trajectories can indicate the path the vehicle 105 is to follow as it traverses a route from one location to another. Thus, the vehicle computing system 110 can take into account a route/route data when performing the motion planning function 170C.

The motion planning system 180 can implement an optimization algorithm, machine-learned model, etc. that considers cost data associated with a vehicle action as well as other objective functions (e.g., cost functions based on speed limits, traffic lights, etc.), if any, to determine optimized variables that make up the motion plan. The vehicle computing system 110 can determine that the vehicle 105 can perform a certain action (e.g., pass an object, etc.) without increasing the potential risk to the vehicle 105 and/or violating any traffic laws (e.g., speed limits, lane boundaries, signage, etc.). For instance, the vehicle computing system 110 can evaluate the predicted motion trajectories of one or more objects during its cost data analysis to help determine an optimized vehicle trajectory through the surrounding environment. The motion planning system 180 can generate cost data associated with such trajectories. In some implementations, one or more of the predicted motion trajectories and/or perceived objects may not ultimately change the motion of the vehicle 105 (e.g., due to an overriding factor). In some implementations, the motion plan may define the vehicle's motion such that the vehicle 105 avoids the object(s), reduces speed to give more leeway to one or more of the object(s), proceeds cautiously, performs a stopping action, passes an object, queues behind/in front of an object, etc.

The vehicle computing system 110 can be configured to continuously update the vehicle's motion plan and a corresponding planned vehicle motion trajectories. For example, in some implementations, the vehicle computing system 110 can generate new motion planning data 175C/motion plan(s) for the vehicle 105 (e.g., multiple times per second, etc.). Each new motion plan can describe a motion of the vehicle 105 over the next planning period (e.g., next several seconds, etc.). Moreover, a new motion plan may include a new planned vehicle motion trajectory. Thus, in some implementations, the vehicle computing system 110 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 105.

The vehicle computing system 110 can cause the vehicle 105 to initiate a motion control in accordance with at least a portion of the motion planning data 175C. A motion control can be an operation, action, etc. that is associated with controlling the motion of the vehicle 105. For instance, the motion planning data 175C can be provided to the vehicle control system(s) 150 of the vehicle 105. The vehicle control system(s) 150 can be associated with a vehicle interface 145 that is configured to implement a motion plan. The vehicle interface 145 can serve as an interface/conduit between the autonomy computing system 140 and the vehicle control systems 150 of the vehicle 105 and any electrical/mechanical controllers associated therewith. The vehicle interface 145 can, for example, translate a motion plan into instructions for the appropriate vehicle control component (e.g., acceleration control, brake control, steering control, etc.). By way of example, the vehicle interface 145 can translate a determined motion plan into instructions to adjust the steering of the vehicle 105 "X" degrees, apply a certain magnitude of braking force, increase/decrease speed, etc. The vehicle interface 145 can help facilitate the responsible vehicle control (e.g., braking control system, steering control system, acceleration control system, etc.) to execute the instructions and implement a motion plan (e.g., by sending control signal(s), making the translated plan available, etc.). This can allow the vehicle 105 to autonomously travel within the vehicle's surrounding environment.

The vehicle computing system 110 can store other types of data. For example, an indication, record, and/or other data indicative of the state of the vehicle (e.g., its location, motion trajectory, health information, etc.), the state of one or more users (e.g., passengers, operators, etc.) of the vehicle, and/or the state of an environment including one or more objects (e.g., the physical dimensions and/or appearance of the one or more objects, locations, predicted motion, etc.) can be stored locally in one or more memory devices of the vehicle 105. Additionally, the vehicle 105 can communicate data indicative of the state of the vehicle, the state of one or more passengers of the vehicle, and/or the state of an environment to a computing system that is remote from the vehicle 105, which can store such information in one or more memories remote from the vehicle 105. Moreover, the vehicle 105 can provide any of the data created and/or store onboard the vehicle 105 to another vehicle.

The vehicle computing system 110 can include the one or more vehicle user devices 180. For example, the vehicle computing system 110 can include one or more user devices with one or more display devices located onboard the vehicle 15. A display device (e.g., screen of a tablet, laptop, and/or smartphone) can be viewable by a user of the vehicle 105 that is located in the front of the vehicle 105 (e.g., driver's seat, front passenger seat). Additionally, or alternatively, a display device can be viewable by a user of the vehicle 105 that is located in the rear of the vehicle 105 (e.g., a back passenger seat). The user device(s) associated with the display devices can be any type of user device such as, for example, a table, mobile phone, laptop, etc. The vehicle user device(s) 180 can be configured to function as human-machine interfaces. For example, the vehicle user device(s) 180 can be configured to obtain user input, which can then be utilized by the vehicle computing system 110 and/or another computing system (e.g., a remote computing system, etc.). For example, a user (e.g., a passenger for transportation service, a vehicle operator, etc.) of the vehicle 105 can provide user input to adjust a destination location of the vehicle 105. The vehicle computing system 110 and/or another computing system can update the destination location of the vehicle 105 and the route associated therewith to reflect the change indicated by the user input.

The vehicle 105 can be configured to perform vehicle services for one or a plurality of different service entities 185. A vehicle 105 can perform a vehicle service by, for example and as further described herein, travelling (e.g., traveling autonomously) to a location associated with a requested vehicle service, allowing user(s) and/or item(s) to board or otherwise enter the vehicle 105, transporting the user(s) and/or item(s), allowing the user(s) and/or item(s) to deboard or otherwise exit the vehicle 105, etc. In this way, the vehicle 105 can provide the vehicle service(s) for a service entity to a user.

A service entity 185 can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of one or more vehicle services to one or more users. For example, a service entity can offer vehicle service(s) to users via one or more software applications (e.g., that are downloaded onto a user computing device), via a website, and/or via other types of interfaces that allow a user to request a vehicle service. As described herein, the vehicle services can include transportation services (e.g., by which a vehicle transports user(s) from one location to another), delivery services (e.g., by which a vehicle transports/delivers item(s) to a requested destination location), courier services (e.g., by which a vehicle retrieves item(s) from a requested origin location and transports/delivers the item to a requested destination location), and/or other types of services. The vehicle services can be wholly performed by the vehicle 105 (e.g., travelling from the user/item origin to the ultimate destination, etc.) or performed by one or more vehicles and/or modes of transportation (e.g., transferring the user/item at intermediate transfer points, etc.).

An operations computing system 190A of the service entity 185 can help to coordinate the performance of vehicle services by autonomous vehicles. The operations computing system 190A can include and/or implement one or more service platforms of the service entity. The operations computing system 190A can include one or more computing devices. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the operations computing system 190 (e.g., its one or more processors, etc.) to perform operations and functions, such as those described herein.

A user 125 can request a vehicle service from a service entity 185. For example, the user 125 can provide user input to a user device 130 to request a vehicle service (e.g., via a user interface associated with a mobile software application of the service entity 185 running on the user device 130). The user device 130 can communicate data indicative of a vehicle service request 195 to the operations computing system 190A associated with the service entity 185 (and/or another associated computing system that can then communicate data to the operations computing system 190A). The vehicle service request 195 can be associated with a user. The associated user can be the one that submits the vehicle service request (e.g., via an application on the user device 130). In some implementations, the user may not be the user that submits the vehicle service request. The vehicle service request can be indicative of the user. For example, the vehicle service request can include an identifier associated with the user and/or the user's profile/account with the service entity 185. The vehicle service request 195 can be generated in a manner that avoids the use of personally identifiable information and/or allows the user to control the types of information included in the vehicle service request 195. The vehicle service request 195 can also be generated, communicated, stored, etc. in a secure manner to protect information.

The vehicle service request 195 can indicate various types of information. For example, the vehicle service request 194 can indicate the type of vehicle service that is desired (e.g., a transportation service, a delivery service, a courier service, etc.), one or more locations (e.g., an origin location, a destination location, etc.), timing constraints (e.g., pick-up time, drop-off time, deadlines, etc.), and/or geographic constraints (e.g., to stay within a certain area, etc.). The service request 195 can indicate a type/size/class of vehicle such as, for example, a sedan, an SUV, luxury vehicle, standard vehicle, etc. The service request 195 can indicate a product of the service entity 185. For example, the service request 195 can indicate that the user is requesting a transportation pool product by which the user would potentially share the vehicle (and costs) with other users/items. In some implementations, the service request 195 can explicitly request for the vehicle service to be provided by an autonomous vehicle or a human-driven vehicle. In some implementations, the service request 195 can indicate a number of users that will be riding in the vehicle/utilizing the vehicle service. In some implementations, the service request 195 can indicate preferences/special accommodations of an associated user (e.g., music preferences, climate preferences, wheelchair accessibility, etc.) and/or other information.

The operations computing system 190A of the service entity 185 can process the data indicative of the vehicle service request 195 and generate a vehicle service assignment that is associated with the vehicle service request. The operations computing system can identify one or more vehicles that may be able to perform the requested vehicle services to the user 195. The operations computing system 190A can identify which modes of transportation are available to a user for the requested vehicle service (e.g., light electric vehicles, human-drive vehicles, autonomous vehicles, aerial vehicle, etc.) and/or the number of transportation modes/legs of a potential itinerary of the user for completing the vehicle service (e.g., single or plurality of modes, single or plurality of legs, etc.). For example, the operations computing system 190A can determined which autonomous vehicle(s) are online with the service entity 185 (e.g., available for a vehicle service assignment, addressing a vehicle service assignment, etc.) to help identify which autonomous vehicle(s) would be able to provide the vehicle service.

The operations computing system 190A and/or the vehicle computing system 110 can communicate with one or more other computing systems 190B that are remote from the vehicle 105. This can include, for example, computing systems associated with government functions (e.g., emergency services, regulatory bodies, etc.), computing systems associated with vehicle providers other than the service entity, computing systems of other vehicles (e.g., other autonomous vehicles, aerial vehicles, etc.). Communication with the other computing systems 190B can occur via the network(s) 120.

Figure 5:
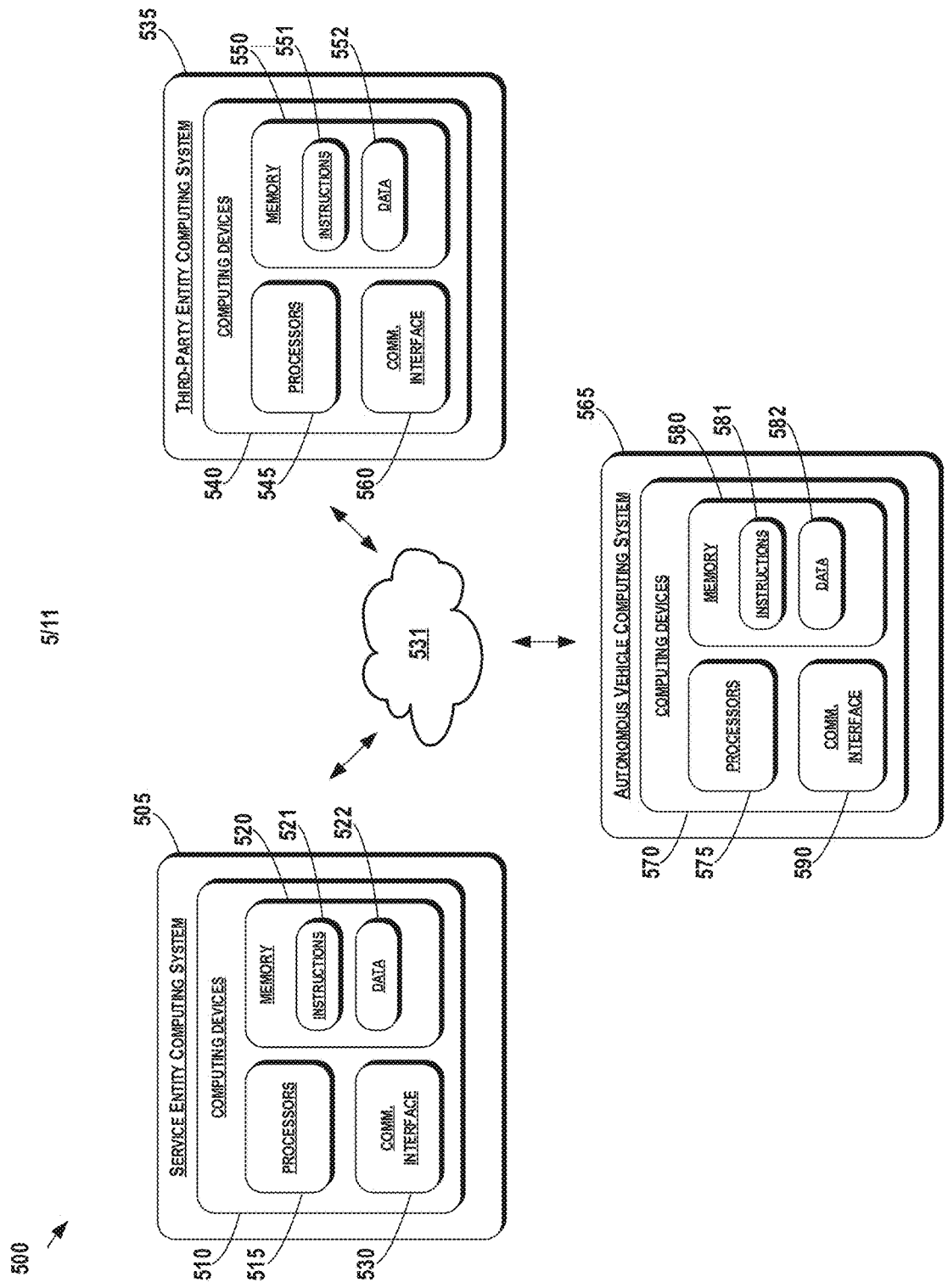
FIG. 5 depicts an example autonomous vehicle system according to example aspects of the present disclosure.

FIG. 5 depicts an example system 500 according to example aspects of the present disclosure. The example system 500 illustrated in FIG. 5 is provided as an example only. The components, systems, connections, and/or other aspects illustrated in FIG. 5 are optional and are provided as examples of what is possible, but not required, to implement the present disclosure. The example system 500 can include a service entity computing system 505 (e.g., that is associated with a service entity). The service entity computing system 505 can represent/correspond to the service entity computing systems 104 described herein. The example system 500 can include a third-party entity computing system 535 (e.g., that is associated with a third-party entity). The third-party entity computing system 535 can represent/correspond to the third-party entity computing systems 106 described herein. The example system 500 can include an autonomous vehicle computing system 565 (e.g., that is onboard an autonomous vehicle). The autonomous vehicle computing system 565 can represent/correspond to the autonomous vehicle computing system 112 described herein. The service entity computing system 505, the third-party entity computing system 535, and the autonomous vehicle computing system 565 can be communicatively coupled to one another over one or more communication network(s) 531. The networks 531 can correspond to any of the networks described herein, such as communication network 108.

The computing device(s) 510 of the service entity computing system 505 can include processor(s) 515 and a memory 520. The one or more processors 515 can be any suitable processing device (e.g., a processor core, a microprocessor, an ASIC, a FPGA, a controller, a microcontroller, etc.) and can be one processor or a plurality of processors that are operatively connected. The memory 520 can include one or more non-transitory computer-readable storage media, such as RAM, ROM, EEPROM, EPROM, one or more memory devices, flash memory devices, data registrar, etc., and combinations thereof.

The memory 520 can store information that can be accessed by the one or more processors 515. For example, the memory 520 (e.g., one or more non-transitory computer-readable storage mediums, memory devices) can include computer-readable instructions 521 that can be executed by the one or more processors 515. The instructions 521 can be software written in any suitable programming language or can be implemented in hardware. Additionally, or alternatively, the instructions 521 can be executed in logically and/or virtually separate threads on processor(s) 515.

For example, the memory 520 can store instructions 521 that when executed by the one or more processors 515 cause the one or more processors 515 (the service entity computing system 505) to perform operations such as any of the operations and functions of the service entity computing system (or for which it is configured), one or more of the operations and functions for communicating between a third-party entity and/or a service entity and/or an autonomous vehicle, one or more portions of methods 200, 300, and 400, and/or one or more of the other operations and functions of the computing systems described herein.

The memory 520 can store data 522 that can be obtained (e.g., acquired, received, retrieved, accessed, created, stored, etc.). The data 522 can include, for example, data associated with communications (e.g., messages, calls, callbacks, etc.), data associated with software package(s) (e.g., Cloud SDK data), data associated with one or more backends, data associated with a Public VIP, batched data, data associated with VIDs, data associated with vehicle registration, data associated with a registration authority, data associated with a certificate authority, data associated with security certificates, data associated with autonomous vehicles, data associated with third-party entities, sensor data, map data, vehicle state data, vehicle location data, perception data, prediction data, motion planning data, data associated with a vehicle client, data associated with a communication network, data associated with an API, data associated with a library, data associated with user interfaces, data associated with user input, and/or other data/information such as, for example, that described herein. In some implementations, the computing device(s) 510 can obtain data from one or more memories that are remote from the service entity computing system 505.

The computing device(s) 510 can also include a communication interface 530 used to communicate with one or more other system(s) on-board an autonomous vehicle and/or remote from the service entity computing system, such as third-party entity computing system 535 and an autonomous vehicle computing system 565. The communication interface 530 can include any circuits, components, software, etc. for communicating via one or more networks (e.g., network(s) 531). The communication interface 530 can include, for example, one or more of a communications controller, receiver, transceiver, transmitter, port, conductors, software and/or hardware for communicating data.

The third-party entity computing system 535 can include one or more computing device(s) 540 that are remote from the service entity computing system 505 and/or the autonomous vehicle computing system 565. The computing device(s) 540 can include one or more processors 545 and a memory 550. The one or more processors 545 can be any suitable processing device (e.g., a processor core, a microprocessor, an ASIC, a FPGA, a controller, a microcontroller, etc.) and can be one processor or a plurality of processors that are operatively connected. The memory 550 can include one or more tangible, non-transitory computer-readable storage media, such as RAM, ROM, EEPROM, EPROM, one or more memory devices, flash memory devices, data registrar, etc., and combinations thereof.

The memory 550 can store information that can be accessed by the one or more processors 545. For example, the memory 550 (e.g., one or more tangible, non-transitory computer-readable storage media, one or more memory devices, etc.) can include computer-readable instructions 551 that can be executed by the one or more processors 545. The instructions 551 can be software written in any suitable programming language or can be implemented in hardware. Additionally, or alternatively, the instructions 551 can be executed in logically and/or virtually separate threads on processor(s) 545.

For example, the memory 550 can store instructions 551 that when executed by the one or more processors 545 cause the one or more processors 545 to perform operations such as any of the operations and functions of the third-party entity computing system (or for which it is configured), one or more of the operations and functions for communicating between a third-party entity and/or a service entity and/or an autonomous vehicle, one or more portions of methods 200, 300, and 400, and/or one or more of the other operations and functions of the computing systems described herein.

The memory 550 can store data 552 that can be obtained. The data 552 can include, for example, data associated with communications (e.g., messages, calls, callbacks, etc.), data associated with software package(s) (e.g., Cloud SDK data), data associated with one or more backends, data associated with a Public VIP, batched data, data associated with VIDs, data associated with vehicle registration, data associated with a registration authority, data associated with a certificate authority, data associated with security certificates, data associated with autonomous vehicles, data associated with third-party entities, sensor data, map data, vehicle state data, vehicle location data, perception data, prediction data, motion planning data, data associated with a vehicle client, data associated with a communication network, data associated with an API, data associated with a library, data associated with user interfaces, data associated with user input, and/or other data/information such as, for example, that described herein.

The computing device(s) 540 can also include a communication interface 560 used to communicate with one or more system(s) onboard an autonomous vehicle and/or another computing device that is remote from the system 535, such as autonomous vehicle computing system 565 and service entity computing system 505. The communication interface 560 can include any circuits, components, software, etc. for communicating via one or more networks (e.g., network(s) 531). The communication interface 560 can include, for example, one or more of a communications controller, receiver, transceiver, transmitter, port, conductors, software and/or hardware for communicating data.

The autonomous vehicle computing system 565 can include one or more computing device(s) 570 that are remote from the service entity computing system 505 and the third-party entity computing system 535. The computing device(s) 570 can include one or more processors 575 and a memory 580. The one or more processors 575 can be any suitable processing device (e.g., a processor core, a microprocessor, an ASIC, a FPGA, a controller, a microcontroller, etc.) and can be one processor or a plurality of processors that are operatively connected. The memory 580 can include one or more tangible, non-transitory computer-readable storage media, such as RAM, ROM, EEPROM, EPROM, one or more memory devices, flash memory devices, data registrar, etc., and combinations thereof.

The memory 580 can store information that can be accessed by the one or more processors 575. For example, the memory 580 (e.g., one or more tangible, non-transitory computer-readable storage media, one or more memory devices, etc.) can include computer-readable instructions 581 that can be executed by the one or more processors 575. The instructions 581 can be software written in any suitable programming language or can be implemented in hardware. Additionally, or alternatively, the instructions 581 can be executed in logically and/or virtually separate threads on processor(s) 575.

For example, the memory 580 can store instructions 581 that when executed by the one or more processors 575 cause the one or more processors 575 to perform operations such as any of the operations and functions of the autonomous vehicle computing system (or for which it is configured), one or more of the operations and functions for communicating between a third-party entity and/or a service entity and/or an autonomous vehicle, one or more portions of methods 200, 300, and 400, and/or one or more of the other operations and functions of the computing systems described herein.

The memory 580 can store data 582 that can be obtained. The data 582 can include, for example, data associated with communications (e.g., messages, calls, callbacks, etc.), data associated with software package(s) (e.g., Cloud SDK data), data associated with one or more backends, data associated with a Public VIP, batched data, data associated with VIDs, data associated with vehicle registration, data associated with a registration authority, data associated with a certificate authority, data associated with security certificates, data associated with autonomous vehicles, data associated with third-party entities, sensor data, map data, vehicle state data, vehicle location data, perception data, prediction data, motion planning data, data associated with a vehicle client, data associated with a telecommunication network, data associated with an API, data associated with a library, data associated with user interfaces, data associated with user input, and/or other data/information such as, for example, that described herein.

The computing device(s) 570 can also include a communication interface 590 used to communicate with one or more system(s) onboard a vehicle and/or another computing device that is remote from the system 565, such as third-party entity computing system 535 and/or service entity computing system 505. The communication interface 590 can include any circuits, components, software, etc. for communicating via one or more networks (e.g., network(s) 531). The communication interface 590 can include, for example, one or more of a communications controller, receiver, transceiver, transmitter, port, conductors, software and/or hardware for communicating data.

The network(s) 531 can be any type of network or combination of networks that allows for communication between devices. In some implementations, the network(s) 531 can include one or more of a local area network, wide area network, the Internet, secure network, cellular network, mesh network, peer-to-peer communication link and/or some combination thereof and can include any number of wired or wireless links. Communication over the network(s) 531 can be accomplished, for example, via a communication interface using any type of protocol, protection scheme, encoding, format, packaging, etc.

In some implementations, the vehicle system of FIG. 1 and the computer architecture of FIG. 5 can be benefited by the systems and methods disclosed herein. The autonomous vehicle system of FIG. 1 and the computer architecture of FIG. 5 can be tested based on the generated data of the systems and methods disclosed herein. Furthermore, the systems and methods disclosed herein can greatly increase the simulation data for autonomous vehicles to be tested on, which can provide larger avenues for safety testing. The larger testing sample size for autonomous vehicles may allow for more certainty when these systems are put on the road and can provide a better sense of security for users using the service described above.

Figure 6:
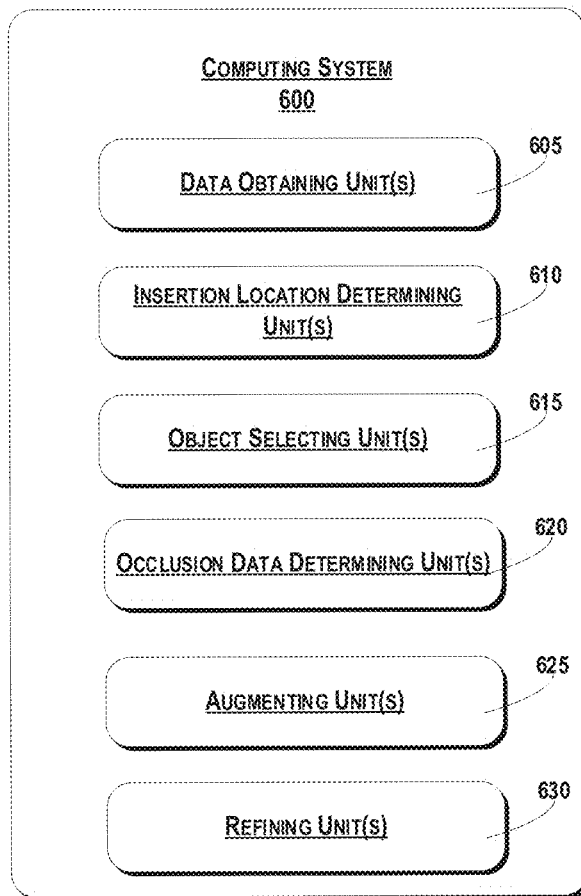
FIG. 6 depicts an example augmenting simulation images system according to example embodiments of the present disclosure.

Various means can be configured to perform the methods and processes described herein. FIG. 6 depicts example units associated with a computing system for performing operations and functions according to example embodiments of the present disclosure. As depicted, FIG. 6 depicts a computing system 600 that can include, but is not limited to, data obtaining unit(s) 605; insertion location determining unit(s) 610; object selecting unit(s) 615; occlusion data determining unit(s) 620; augmenting unit(s) 625; and refining unit(s) 630. In some implementations one or more units may be implemented separately. In some implementations, one or more units may be included in one or more other units.

In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein (including the claims).

The operations and functions may include obtaining real world environment data descriptive of an environment. The environment data may be processed to determine an insertion location, wherein the insertion location may include a location that provides a plausible placement for a vehicle in the environment while also matching environment dynamics. The operation may further include accessing an object bank and determining a set of object data to insert into the insertion location with respect to the viewpoints and depths depicted in the determined insertion location. In some implementations, the operations and functions can generate occlusion data with respect to the environment data, the insertion location, and the object data. The occlusion data may be used to determine what features in the environment may occlude the inserted object. In some implementations, the operations and functions may include augmenting one or more images of the environment data to generate an augmented image. The augmentation may include inserting the object data into the insertion location with the occlusion data determining what the object occludes and what occludes the object. In some implementations, the augmented image may be refined to generate a refined augmented image as part of the operations and functions.

The object bank may be generated by means that can be programmed to perform one or more algorithm(s) for carrying out the operations and functions. The operations and functions may include obtaining a set of image data, and a set of Light Detection and Ranging (LiDAR) point cloud data. The operations may include processing, by the computing system, the set of image data with a first embedding model to generate a first feature embedding, and processing, by the computing system, the set of LiDAR data with a second embedding model to generate a second feature embedding. The operations may include processing, by the computing system, the first feature embedding and the second feature embedding with a third embedding model to generate a three-dimensional mesh model of an object based at least in part on the first feature embedding and the second feature embedding. In some implementations, the operations may include generating, by the computing system, predicted image data based at least in part on the three-dimensional mesh model, in which the predicted image data includes a predicted reconstruction of the first set of object data, and generating, by the computing system, predicted point cloud data based at least in part on the three-dimensional mesh model, in which the predicted point cloud data includes a predicted reconstruction of the second set of object data. The operations may include evaluating, by the computing system, a loss function that compares the predicted image data and the predicted point cloud data with the first set of object data and the second set of object data, in which the loss function includes a silhouette loss and a Light Detection and Ranging (LiDAR) loss. In some implementations, the silhouette loss compares a generated predicted silhouette based at least in part on the predicted image data against a generated ground truth silhouette based at least in part on the first set of object data, in which the LiDAR loss compares vertices of the predicted point cloud data against a set of ground truth vertices data based at least in part on the second set of object data. In some implementations, the operations may include modifying, by the computing system, parameters of at least one of the first embedding model and the second embedding model based on the loss function.

Figure 7:
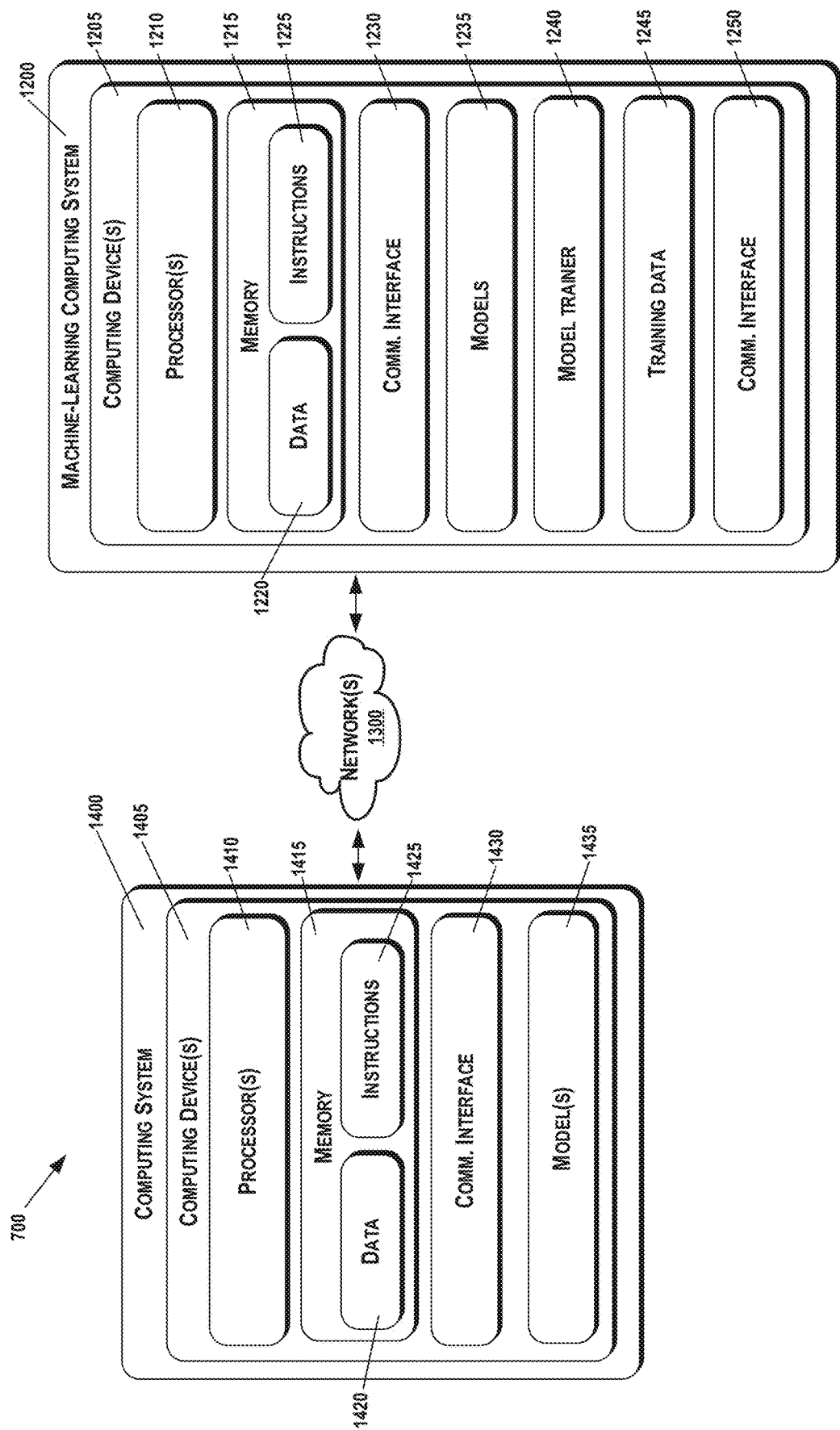
FIG. 7 depicts a block diagram of an example computing system according to example embodiments of the present disclosure.

FIG. 7 depicts a block diagram of an example computing system 700 according to example embodiments of the present disclosure. The example system 700 includes a computing system 1400 and a machine learning computing system 1200 that are communicatively coupled over one or more networks 1300.

In some implementations, the computing system 1405 can perform environment data intake and photorealistic, geometry-aware image simulation generation. Alternatively, in some implementations, the computing system 1405 can perform data collection and reconstruction to generate an object bank of real world objects. In some implementations, the computing system 1405 can be included in an autonomous vehicle. For example, the computing system 1405 can be on-board the autonomous vehicle. In other implementations, the computing system 1405 is not located on-board the autonomous vehicle. For example, the computing system 1405 can operate offline to process the observation data collected on an environment and generate a new photorealistic image simulation based on the processed environment data. The computing system 1405 can include one or more distinct physical computing devices.

The computing system 1405 can include one or more processors 1410 and a memory 1415. The one or more processors 1410 can be any suitable processing device (e.g., a processor core, a microprocessor, an ASIC, a FPGA, a controller, a microcontroller, etc.) and can be one processor or a plurality of processors that are operatively connected. The memory 1415 can include one or more non-transitory computer-readable storage media, such as RAM, ROM, EEPROM, EPROM, one or more memory devices, flash memory devices, etc., and combinations thereof.

The memory 1415 can store information that can be accessed by the one or more processors 1410. For instance, the memory 1415 (e.g., one or more non-transitory computer-readable storage mediums, memory devices) can store data 1420 that can be obtained, received, accessed, written, manipulated, created, and/or stored. The data 1420 can include, for instance, include examples as described herein. In some implementations, the computing system 1400 can obtain data from one or more memory device(s) that are remote from the computing system 1400.

The memory 1415 can also store computer-readable instructions 1425 that can be executed by the one or more processors 1420. The instructions 1425 can be software written in any suitable programming language or can be implemented in hardware. Additionally, or alternatively, the instructions 1425 can be executed in logically and/or virtually separate threads on processor(s) 1410.

For example, the memory 1415 can store instructions 1425 that when executed by the one or more processors 1410 cause the one or more processors 1410 (the computing system) to perform any of the operations and/or functions described herein, including, for example, insert functions.

According to an aspect of the present disclosure, the computing system 1405 can store or include one or more machine-learned models 1435. As examples, the machine-learned models 1435 can be or can otherwise include various machine-learned models such as, for example, neural networks (e.g., deep neural networks), decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), convolutional neural networks, or other forms of neural networks.

In some implementations, the computing system 1400 can receive the one or more machine-learned models 1435 from the machine learning computing system 1200 over network(s) 1300 and can store the one or more machine-learned models 1435 in the memory 1415. The computing system 1400 can then use or otherwise implement the one or more machine-learned models 1435 (e.g., by processor(s) 1410). In particular, the computing system 1400 can implement the machine learned model(s) 1435 to generate photorealistic image simulation data.

The machine learning computing system 1200 can include one or more computing devices 1205. The machine learning computing system 1200 can include one or more processors 1210 and a memory 1215. The one or more processors 1210 can be any suitable processing device (e.g., a processor core, a microprocessor, an ASIC, a FPGA, a controller, a microcontroller, etc.) and can be one processor or a plurality of processors that are operatively connected. The memory 1215 can include one or more non-transitory computer-readable storage media, such as RAM, ROM, EEPROM, EPROM, one or more memory devices, flash memory devices, etc., and combinations thereof.

The memory 1215 can store information that can be accessed by the one or more processors 1210. For instance, the memory 1215 (e.g., one or more non-transitory computer-readable storage mediums, memory devices) can store data 1220 that can be obtained, received, accessed, written, manipulated, created, and/or stored. The data 1220 can include, for instance, include examples as described herein. In some implementations, the machine learning computing system 1200 can obtain data from one or more memory device(s) that are remote from the machine learning computing system 1200.

The memory 1210 can also store computer-readable instructions 1225 that can be executed by the one or more processors 1210. The instructions 1225 can be software written in any suitable programming language or can be implemented in hardware. Additionally, or alternatively, the instructions 1225 can be executed in logically and/or virtually separate threads on processor(s) 1210.

For example, the memory 1215 can store instructions 1225 that when executed by the one or more processors 1210 cause the one or more processors 1210 (the computing system) to perform any of the operations and/or functions described herein, including, for example, insert functions.

In some implementations, the machine learning computing system 1200 includes one or more server computing devices. If the machine learning computing system 1200 includes multiple server computing devices, such server computing devices can operate according to various computing architectures, including, for example, sequential computing architectures, parallel computing architectures, or some combination thereof.

In addition or alternatively to the model(s) 1235 at the computing system 1400, the machine learning computing system 1200 can include one or more machine-learned models 1235. As examples, the machine-learned models 1235 can be or can otherwise include various machine-learned models such as, for example, neural networks (e.g., deep neural networks), decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), convolutional neural networks, or other forms of neural networks.

As an example, the machine learning computing system 1200 can communicate with the computing system 1400 according to a client-server relationship. For example, the machine learning computing system 1200 can implement the machine-learned models 1235 to provide a web service to the computing system 1400. For example, the web service can provide the ability to input environment data or object data to generate new photorealistic image data with either the inputted object data in a new environment or the environment data inputted with a new object inserted.

Thus, machine-learned models 1435 can located and used at the computing system 1400 and/or machine-learned models 1235 can be located and used at the machine learning computing system 1200.

In some implementations, the machine learning computing system 1200 and/or the computing system 1400 can train the machine-learned models 1435 and/or 1440 through use of a model trainer 1240. The model trainer 1240 can train the machine-learned models 1435 and/or 1240 using one or more training or learning algorithms. One example training technique is backwards propagation of errors. In some implementations, the model trainer 1240 can perform supervised training techniques using a set of labeled training data. In other implementations, the model trainer 1240 can perform unsupervised training techniques using a set of unlabeled training data. The model trainer 1240 can perform a number of generalization techniques to improve the generalization capability of the models being trained. Generalization techniques include weight decays, dropouts, or other techniques.

In particular, the model trainer 1240 can train a machine-learned model 1435 and/or 1440 based on a set of training data 1245. The training data 1245 can include, for example, obtaining a training image. The model trainer may generate an image segmentation mask for the training image, and the training image may be augmented in some form to generate an augmented image. The image segmentation mask and the augmented image may be processed by the refinement model to generate a refined image. The refined image may then be compared to the original training image. The model trainer may make modifications to the refinement model's parameters in response to the comparison. The model trainer 1240 can be implemented in hardware, firmware, and/or software controlling one or more processors.

The computing system 1400 and the machine learning computing system 1200 can each include a communication interface 1430 and 1250, respectively. The communication interfaces 1430/1250 can used to communicate with one or more systems or devices, including systems or devices that are remotely located from the computing system 1400 and the machine learning computing system 1200. A communication interface 1430/1250 can include any circuits, components, software, etc. for communicating with one or more networks (e.g., 1300). In some implementations, a communication interface 1430/1250 can include, for example, one or more of a communications controller, receiver, transceiver, transmitter, port, conductors, software and/or hardware for communicating data.

The network(s) 1300 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 1300 can be accomplished, for instance, via a network interface using any type of protocol, protection scheme, encoding, format, packaging, etc.

FIG. 7 illustrates one example computing system 700 that can be used to implement the present disclosure. Other computing systems can be used as well. For example, in some implementations, the computing system 1400 can include the model trainer 1240 and the training dataset 1245. In such implementations, the machine-learned models 1240 can be both trained and used locally at the computing system 1400. As another example, in some implementations, the computing system 1400 is not connected to other computing systems.

In addition, components illustrated and/or discussed as being included in one of the computing systems 1400 or 1200 can instead be included in another of the computing systems 1400 or 1200. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

Example Methods

Figure 2:
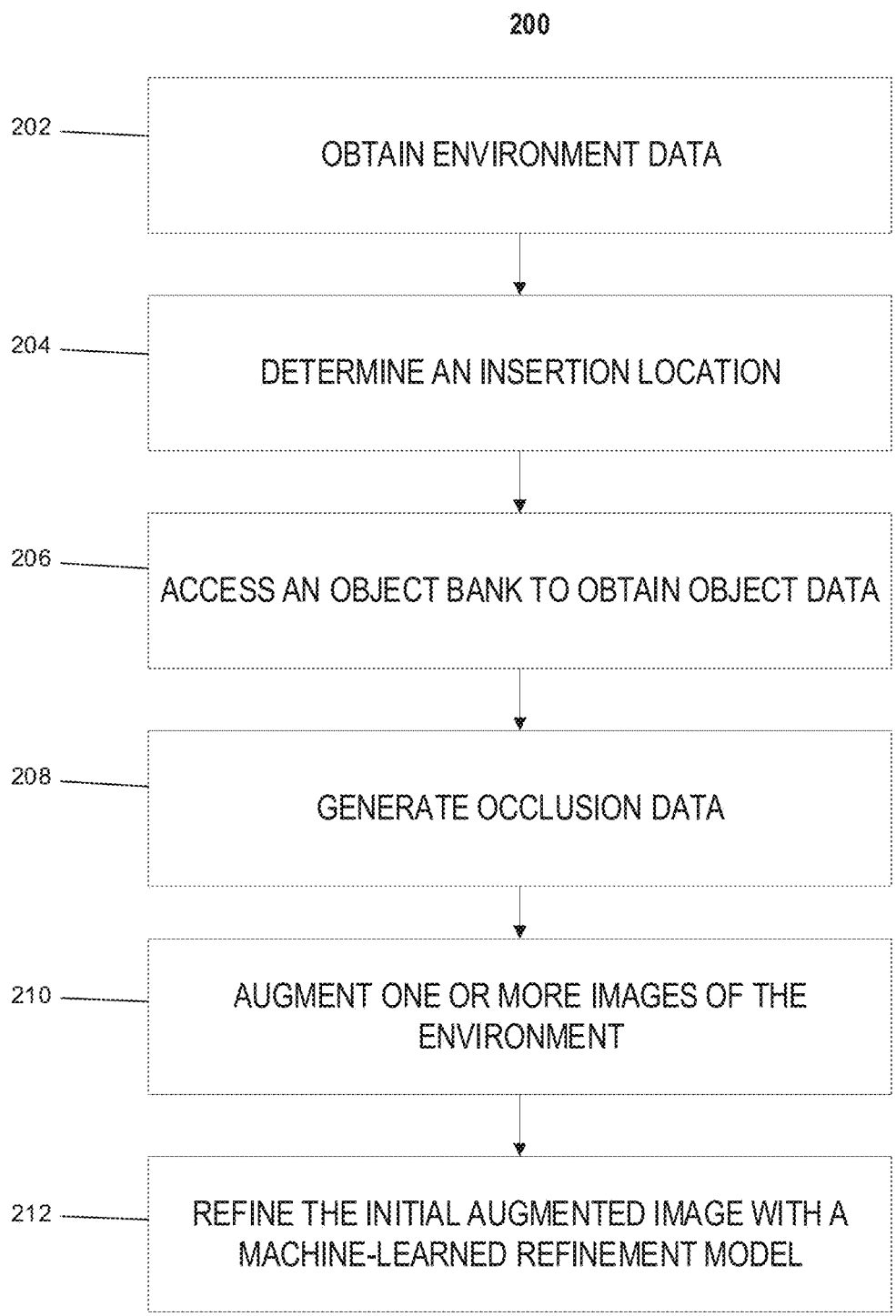
FIG. 2 depicts a flowchart diagram of an example method to generate augmented image data according to example embodiments of the present disclosure.

FIG. 2 depicts a flow diagram of an example method 200 for generation of photorealistic image simulation data according to example embodiments of the present disclosure. One or more portion(s) of the method 200 can be implemented by one or more computing devices such as, for example, the computing devices described in FIGS. 5, 6, and 7. Moreover, one or more portion(s) of the method 200 can be implemented as an algorithm on the hardware components of the device(s) described herein (e.g., as in FIGS. 5, 6, and 7). FIG. 2 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (202), the method 200 can include obtaining environment data. For instance, a computing system can receive environment data descriptive of an environment from the data collected by a self-driving, or autonomous, vehicle. The environment data can include one or more images depicting the environment from one or more viewpoints. The environment data may further include LiDAR point cloud data and lane graph maps. Lane graph maps may depict the dynamics of objects throughout the environment such as the direction of traffic for a particular lane on a street.

At (204), the method 200 can include determining an insertion location. The determination of the insertion location may be dependent on the processing of the environment data to determine open locations in the environment. The insertion location can also be tested to determine whether insertion of an item at that location leads to a collision. The collision testing can ensure the dynamics of the insertion is realistic. In some implementations, determining the insertion location can include randomly sampling placements from lane regions in the environment data, retrieving orientation data from the lane graph map on the sampled locations, and rejecting the sampled locations that lead to collisions.

At (206), the method 200 can include accessing an object bank to obtain object data. The obtained object data may be determined based at least in part on the insertion location. The selected object data may be determined by sampling the object bank to retrieve possible data sets with similar viewpoints and depths with respect to the viewpoints and depths found at the insertion location. The viewpoints and depths of the sampled data sets may then be scored. Data sets with scores indicating similar viewpoints and depths to the insertion location viewpoints and depths may then undergo collision checking. The object data may be selected as the best scoring data set that did not result in a collision. The object data may include real world images collected by an autonomous vehicle.

At (208), the method 200 can include generating occlusion data. Occlusion data can be generated based on the environment data, the insertion location, and the object data. The occlusion data may be generated by processing a LiDAR sweep of the environment from the environment data and interpolating the depths of an image plane to obtain the estimated depth map of the image. The rendered depths of the object from the object data may also be processed. The depths of the environment and the depths of the object are evaluated pixel by pixel to generate occlusion masks. The occlusion masks may be used as layers or individually.

At (210), the method 200 can include augmenting one or more images of the environment to generate an initial augmented image. The augmentation of the images can involve placing the object data into the environment at the determined insertion location and utilizing the occlusion data to determine the features of the environment that occlude the object or are going to be occluded by the object.

At (212), the method 200 can include refining the initial augmented image with a machine-learned refinement model. The refinement model can be used to generate a refined augmented image. The refinement model may process the initial augmented image to determine if texture correction, color correction, or contrast correction is needed. The refinement model may be used to provide texture synthesis to the border of the inserted object to provide a smooth and realistic transition between the object and the environment.

Figure 3:
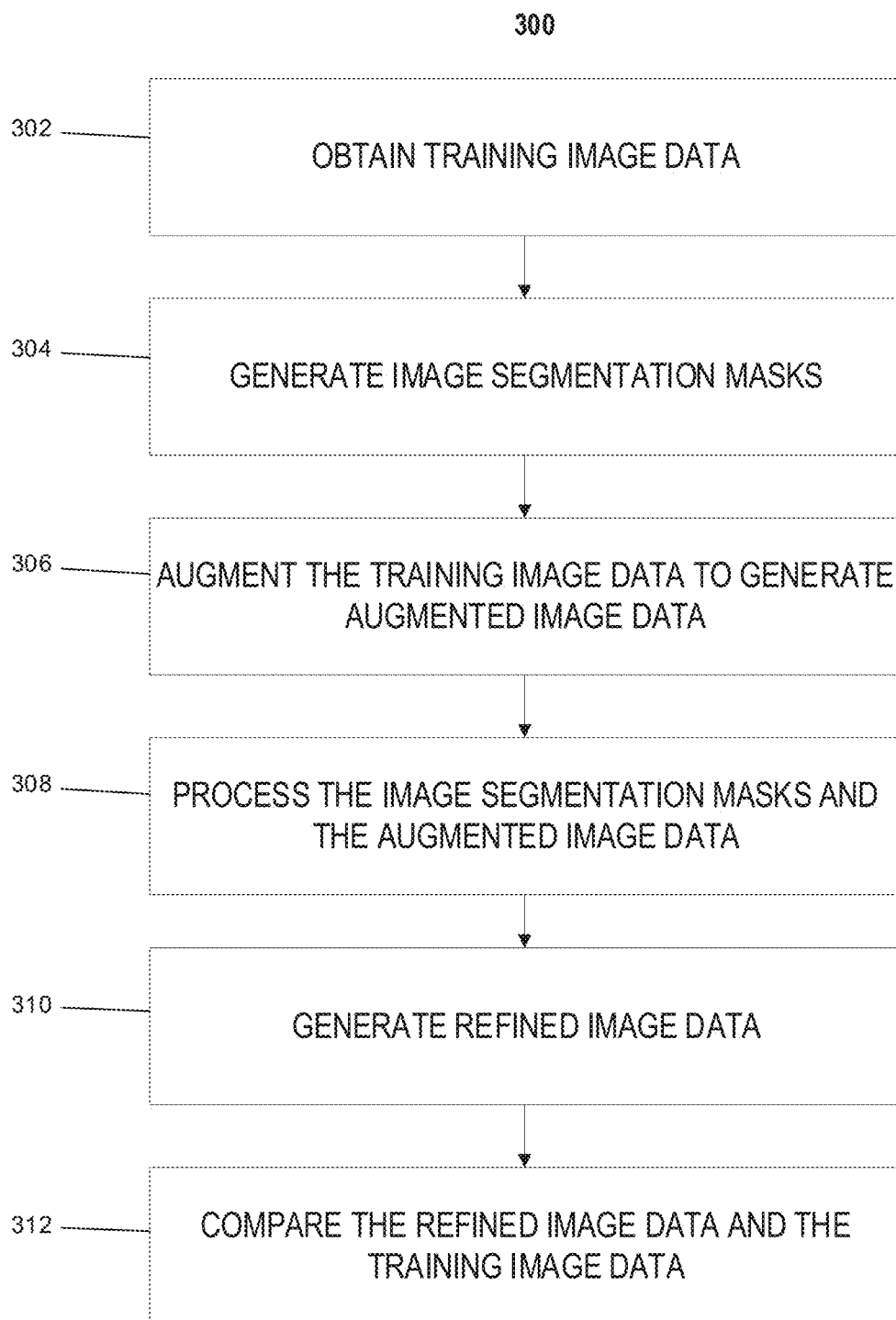
FIG. 3 depicts a flowchart diagram of an example method to train a machine-learned image refinement model according to example embodiments of the present disclosure.

FIG. 3 depicts a flow diagram of an example method 300 for training the refinement model according to example embodiments of the present disclosure. One or more portion(s) of the method 300 can be implemented by one or more computing devices such as, for example, the computing devices described in FIGS. 5, 6, and 7. Moreover, one or more portion(s) of the method 300 can be implemented as an algorithm on the hardware components of the device(s) described herein (e.g., as in FIGS. 5, 6, and 7). FIG. 3 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (302), the method 300 can include obtaining training image data. The training image data may depict an environment with various objects and features. The objects and features may include vehicles, humans, light posts, and other actors in the environment.

At (304), the method 300 can include generating image segmentation masks. The image segmentation masks may correspond to various objects and features found in the environment of the training image data.

At (306), the method 300 can include augmenting the training image data to generate augmented image data. The augmenting of the training image may include causing a distortion of one portion of the image. The distortion can be a change in color saturation of an object or distorting the contrast of an area in the training image data.

At (308), the method 300 can include processing the image segmentation masks and the augmented image data. The processing of the image segmentation masks and the augmented image data may be completed utilizing a refinement model. The refinement model may determine if texture correction or color correction are needed. The refinement model may determine if the image data needs correction of saturation or contrast.

At (310), the method 300 can include generating refined image data. The refined image data can be generated by the refinement model in response to the processing of the image segmentation masks and the augmented image data.

At (312), the method 300 can include comparing the refined image data and the training image data. The method may further include evaluating a loss function that compares the refined image data and the training image data. The loss function can be a perceptual loss or a GAN loss. Furthermore, the method may further include modifying the parameters of the refinement model in response to the comparison of the refined image data and the training image data.

Figure 4:
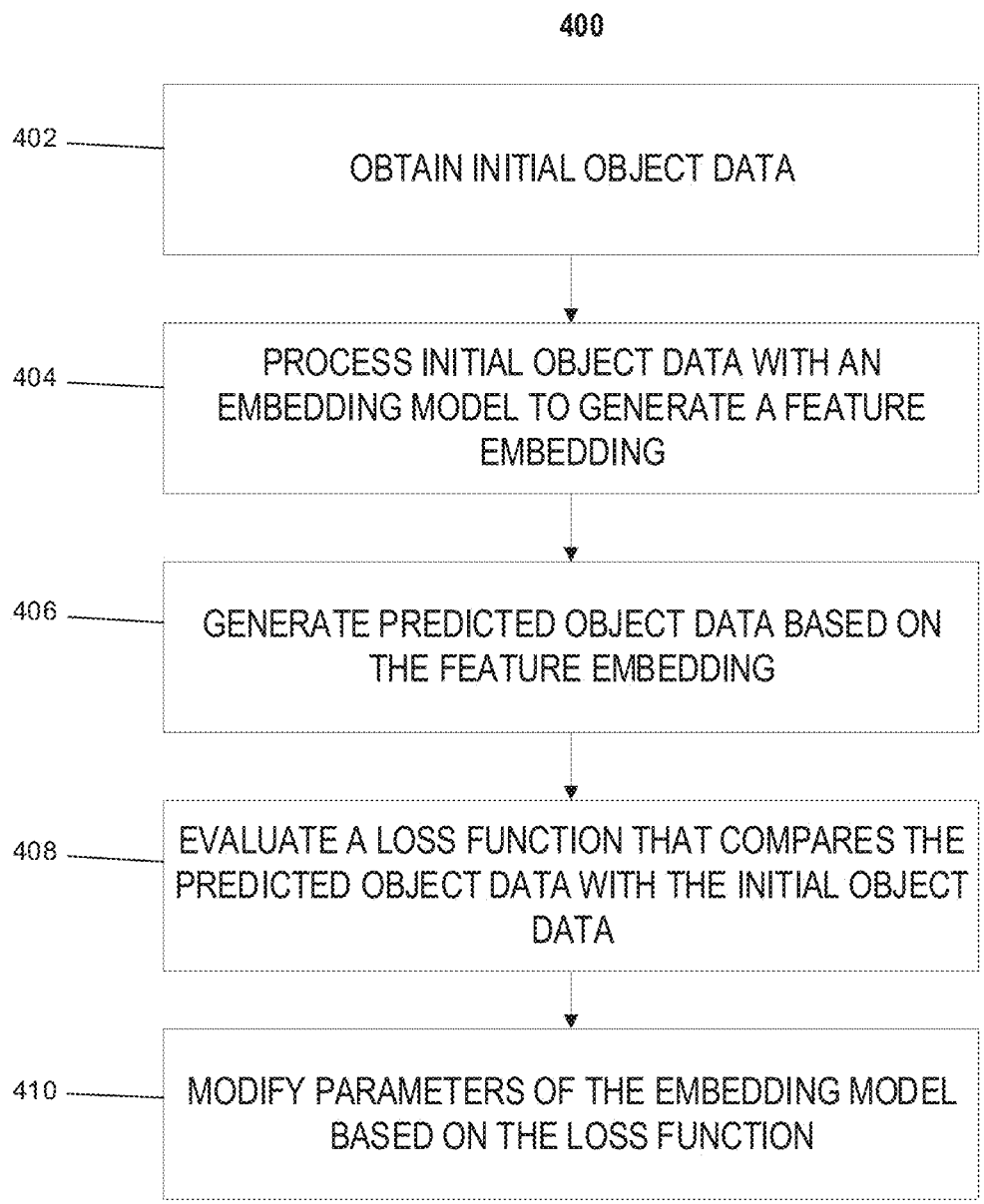
FIG. 4 depicts a flowchart diagram of an example method to train a machine-learned object reconstruction model according to example embodiments of the present disclosure.

FIG. 4 depicts a flow diagram of an example method 400 for object data intake and reconstruction for generating an object bank according to example embodiments of the present disclosure. One or more portion(s) of the method 400 can be implemented by one or more computing devices such as, for example, the computing devices described in FIGS. 1, 5, 6, and 7. Moreover, one or more portion(s) of the method 400 can be implemented as an algorithm on the hardware components of the device(s) described herein (e.g., as in FIGS. 1, 5, 6, and 7). FIG. 4 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (402), the method 400 can include obtaining initial object data. The initial object data may include image data and LiDAR point cloud data. The initial object data may be real world data. The real world data may be data collected by an autonomous vehicle.

At (404), the method 400 can include processing the initial object data with an embedding model to generate a feature embedding. The processing step may include processing the image data of the initial object data with a first embedding model to generate a first feature embedding. The processing may further include processing the LiDAR data of the initial object data with a second embedding model to generate a second feature embedding. The first feature embedding and the second feature embedding may then be processed by a third embedding model to generate the feature embedding. The feature embedding may include a 3D mesh.

At (406), the method 400 can include generate predicted object data based on the feature embedding. The generated predicted data may include predicted image data and predicted LiDAR point cloud data.

At (408), the method 400 can include evaluating a loss function that compares the predicted object data with the initial object data. The loss function may be a summation of a silhouette loss, a LiDAR loss, and a regularization loss. The silhouette loss may focus on comparing the predicted image data and the image data of the initial object data. The LiDAR loss may focus on comparing the predicted LiDAR data and the LiDAR data of the initial object data. In some implementations, the regularization loss may be further split into a regularization loss, a normal loss, and a Laplacian loss. The regularization loss may penalize long edges, distance between a vertex and the centroid of neighboring vertices, and varying normal directions.

At (410), the method 400 can include modifying parameters of the embedding model based on the loss function. In some implementations, the parameters of the first, second, or third embedding models may be modified in response to the evaluation of the loss function.

Example Model Arrangements

In some implementations, the object bank may include a plurality of data for object reconstruction. The data may allow the system or method to reconstruct 3D objects. The data may be large-scale prerecorded data.

One example of large-scale data collection can be data collection from recording with a self-driving vehicle around a major city. Cameras, LiDAR data, and 3D bounding boxes may all be utilized to perform 3D object reconstruction.

Each reconstructed object may be registered in the object bank for future insertion. In some implementations, the reconstructed object data can include the object's 3D mesh, images of the object, and object pose in ego-vehicle-centric coordinates.

Another example of object bank data collection may include a learning-based, multi-view, multi-sensor reconstruction approach for 3D dynamic object meshes that does not use ground-truth 3D-shape for training. In this example, 3D bounding boxes can be used to exploit weak annotations.

One example of input and output parameterization for object bank generation may include receiving camera image data and LiDAR point cloud data and outputting the object's region of interest (ROI) and a silhouette. The example system may include for each object i, the network takes as input camera observations $I_i$, 4×4 camera projection matrices $P_i$, and LiDAR scans $X_i$ of an object from multiple view angles. The system can leverage 3D bounding boxes to gather LiDAR points inside the bounding box as the LiDAR input. The system or method may then project the 3D bounding boxes to the image and get the object's region of interest (ROI) and silhouette automatically through an instance segmentation network. The outputs may be parameterized as a 3D mesh $M_i = \{V_i, F_i\}$ where $V_i$ and $F_i$ are the vertices and faces of the mesh, respectively.

Figure 8:
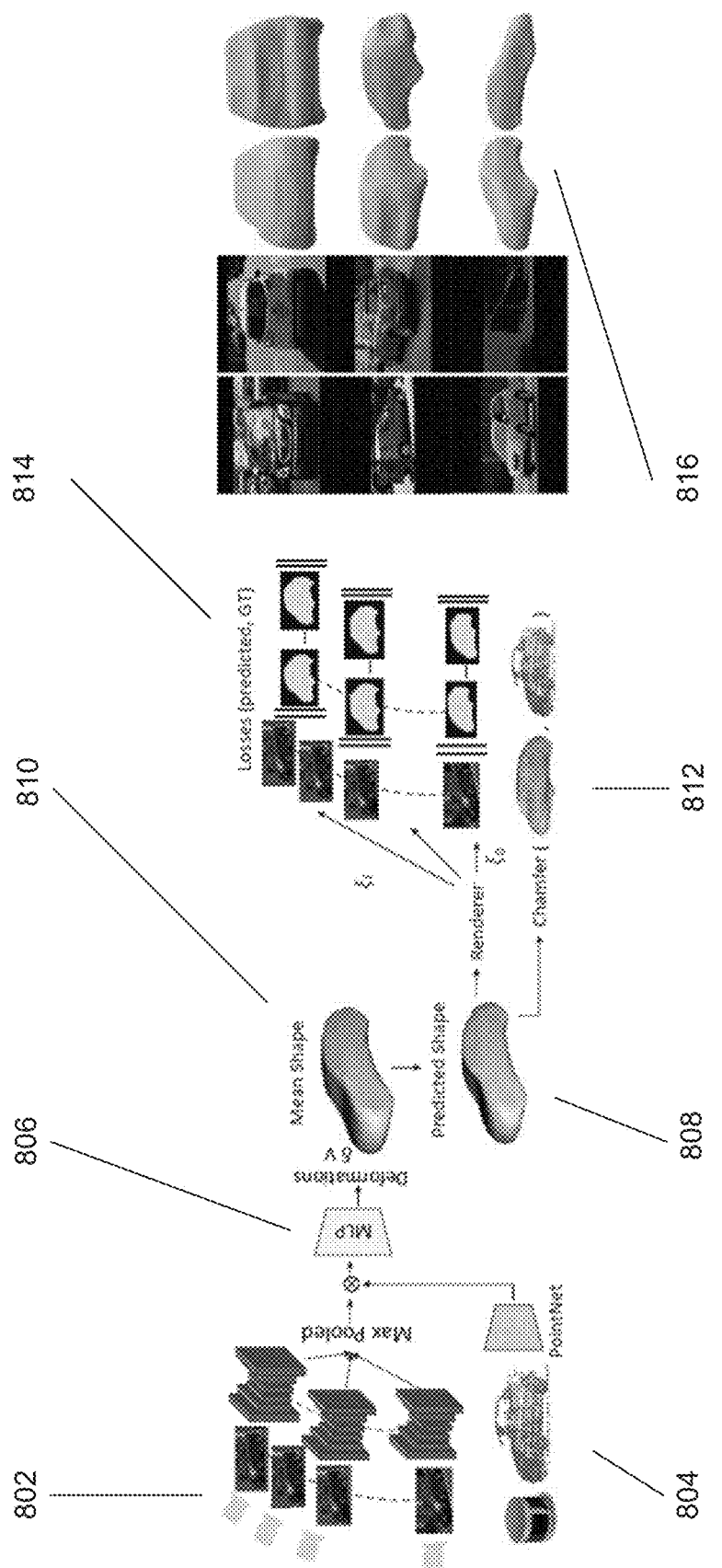
FIG. 8 depicts a graphical diagram of an example process to train an object reconstruction database according to example embodiments of the present disclosure.

FIG. 8 depicts one example network architecture for object bank generation. The depicted architecture includes two submodules. The first submodule 802 may include the intake of ROI-cropped camera image data into an embedding generation model (e.g., a U-Net). For each ROI-cropped camera image the U-Net can output a corresponding feature map. The feature maps from multiple images may be aggregated into a one-dimensional latent representation using max-pooling. A similar latent representation can be generated for the LiDAR point cloud data 804 using another embedding model (e.g., a PointNet network). The system can then concatenate the LiDAR and camera features and pass them through another model (e.g., a multi-layer perceptron (MLP)) 806 to output a final shape 810, as part of the second submodule. In some implementations, the 3D shape may be parameterized as a category-specific mean shape in the canonical pose and a 3D deformation per vertex.

An example of the system's unsupervised learning for object reconstruction and object generation may include a summation of different loss functions. The system may be trained using an end-to-end approach in an unsupervised manner to obtain parameters of the reconstructed network and the mean shape. The training function may be computed as the sum of three losses encoding the agreement between the 3D shape and the camera and LiDAR observations, as well as the regularization term. The training function may be denoted as:

$$\ell_{total} = \sum_i \ell_{silhouette}(M_i; P_i, I_i) + \ell_{lidar}(M_i; X_i) + \ell_{regularization}(M_i).$$

The silhouette loss may measure the consistency between the ground truth 2D silhouette and the silhouette of the rendered 3D shape. The silhouette loss may be denoted as:

$$\ell_{silhouette}(M_i; P_i, I_i) = \|S_i - \tau(M_i, P_i)\|_2^2.$$

Where $S_i \in \mathbb{R}^{D \times W \times H}$ can be 2D silhouette masks inferred from pre-trained instance segmentation network, given the input image $I_i$. Moreover, $\tau(M, P)$ may be a differentiable neural rendering operator that renders a differentiable mask on the camera image given a projection matrix P.

The LiDAR loss may represent the consistency between the LiDAR point cloud and the mesh vertices, defined as asymmetric Chamfer distance. The LiDAR loss may be denoted as:

$$\ell_{lidar}(M_i, X_i) = \sum\nolimits_{x \in X_i} \min_{v \in V_i} \|x - v\|_2^2.$$

The choice of asymmetric Chamfer as opposed to a symmetric variant may ensure accurate reconstruction of the complete shape rather than fitting to the partial observations from the LiDAR point cloud.

The regularization loss may be used to minimize a set of regularizers. The regularization loss can enforce prior knowledge over the resulting 3D shape including local smoothness on the vertices and the normal. The regularization loss may be denoted as:

$$\ell_{regularization}(M_i) = \alpha \ell_{edge}(M_i) + \beta \ell_{normal}(M_i) + \gamma \ell_{laplacian}(M_i).$$

The edge regularization term may penalize long edges, which may prevent isolated vertices. $\ell_{edge}(M_i) = \Sigma_{v \in V_i} \Sigma_{v' \in N_v} \|v - v'\|_2^2$, with NV being the first ring neighbor vertices of a given vertex v. The Laplacian regularization can preserve local geometry and prevents intersecting mesh faces by encouraging the centroid of the neighboring vertices to be close to the vertex: $\ell_{laplacian}(M_i) = \Sigma_{v \in V_i} \|\Sigma_{v' \in N_v}(v-v')\|_2^2$. The normal regularization can enforce smoothness of the local surface normal (i.e., neighboring faces are expected to have similar normal direction): $\ell_{normal}(M_i) = \Sigma_{(i,j) \in N_F}(1-\{n_i, n_j\})$. Where $N_F$ is the set of all neighboring faces indices, and $n_i$ is the surface normal of a given face $f_i$.

Figure 10:
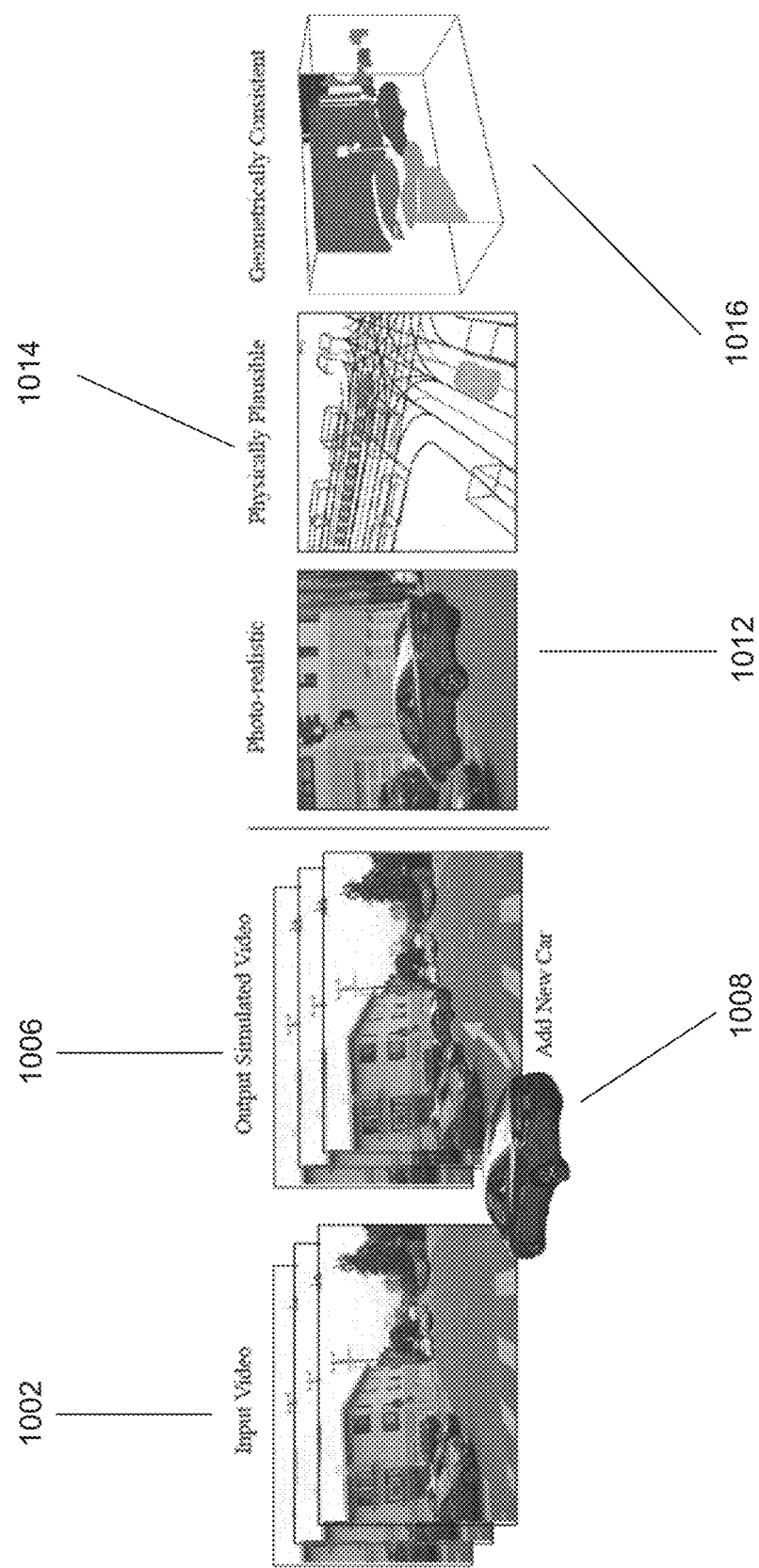
FIG. 10 depicts a graphical diagram of an example process to generate a simulation image according to example embodiments of the present disclosure.

In some implementations, the system or method may intake camera video footage, LiDAR point clouds, and a lane graph map as input and may automatically output a photo-realistic video with new objects inserted into the scene (e.g., the input 1002 and output 1006 depicted in FIG. 10). The new objects can be interacting with other dynamic agents. In some implementations, the system or method may first select the placement of objects onto the HD map so that the new image reflects the traffic and 3D layout in a realistic manner. The system may then select objects from the reconstructed 3D asset bank based on the determined possible placements for insertion. The system can then use novel-view rendering with 3D occlusion reasoning with respect to all elements in the scene, to create the appearance of the new object in the new image. The last step may be the utilization of a neural network to fill in the boundary of the inserted objects with data to generate a smooth transition between the scene and the new object (e.g., the image synthesis 111 depicted in FIG. 11). The transition may be determined by considering the lighting and texture of the scene.

An example object placement process, or insertion location determination, for the system may include an object sampling process, dynamics determination, and a segment retrieval process. The object sampling process may determine where to place the new object in the scene. The dynamics determination may determine how the new object will move. While the segment retrieval process may determine which set of object data is going to be utilized as the new object.

The object sampling process can include a 3D sampling procedure, which takes advantage of priors collected about how vehicles behave in cities. High-definition maps that contain the location of lanes in a bird's eye view (BEV) may be utilized to understand the priors (e.g. scale, location, orientation, and motion) of the lanes. The priors may be used to parameterize the object placement as a tuple (x, y, θ) defining the object center and orientation in BEV, which can later be converted to a 6DoF pose using the local ground elevation. The system may randomly sample a placement (x, y) from the lane regions lying within the camera's field of view and retrieve the orientation from the lane. The system may then reject all samples that result in collision with other actors or background objects.

Dynamics determination can complement the object sampling process by utilizing an Intelligent Driver Model (IDM) fitted to a kinematic model. The models can update the simulated object's state for realistic interactions with surrounding traffic.

The segment retrieval process, or object data selection, may be utilized to determine which object is going to be placed in the scene. The segment retrieval process can select objects as well as source textures most appropriate for warping to the target view. The object bank can be filtered to choose objects and source textures from the object bank that have similar point of view and distance to a target goal. In some implementations, the target goal can reflect the insertion location and motion determined by the object sampling process and the dynamics determination. For objects filtered from the object bank, the system or method may score the object data poses based on the overlap in target and source viewpoints. Objects may then be sampled (as opposed to a hard max) according to a categorical distribution weighted by the object data's inverse score. The sampled objects can then be processed to determine if the object placed in the desired placement would result in a collision. If the sample object would not result in a collision, the object, the insertion location, and the dynamics of the object may be determined as valid.

In some implementations, once the object placement (i.e. insertion location), object dynamics, and object selection are determined, the system may determine if novel-view warping is needed. The 3D mesh $M_s$ may first be rendered at the selected target viewpoint to generate a corresponding target depth map, $D_t$. The rendered depth map and the source camera image $I_s$ may then be used to generate the object's 2D texture map using an inverse warping operation denoted as:

$$I_t = I_s\big(\pi\big(\pi^{-1}(D_t, P_t), P_s\big)\big), \text{ where } D_t = \psi(M, P_t).$$

Where $P_s/P_t$ is the source/target camera matrices, and $\psi$ is a differentiable neural renderer that produces a depth image given the 3D mesh M and camera matrix P. $\pi$ may be the perspective projection, and $\pi^{-1}$ may be the inverse projection that takes the depth image and camera matrix as input and outputs 3D points. The 2D texture map may reflect image distortion in response to processed scene data.

In some implementations, the system or method may then determine object occlusion by analyzing the scene for actors that occlude the inserted object at some point in the scene footage. The actors may be vegetation, fences, or other dynamic objects. The occluding actors can be determined by projecting a LiDAR sweep corresponding to a target frame onto the image plane and interpolating the depths to obtain the estimated depth map of the image. Using the rendered depth of the object, an occlusion mask can then be computed by evaluating if each pixel of the target image's depth is smaller than the object's corresponding pixel's depth. Instance masks can then be used to treat individual masks as layers and can reason about occlusion using the median depths of the individual masks. The masks may then be used to determine which layers may occlude the object and which layers the object will occlude.

In some implementations, the system or method may include a final post-composition synthesis for light correction, texture correction, and color balancing. The system may leverage an image synthesis network to naturally blend the source segment to the target scene. In some implementations, the system network may take the target background image $B_t$, masked target object rendering $I_t$, as well as the object binary silhouette $S_t$ as input. The network may then output the final image that naturally composites the background and rendered object. The synthesis network architecture may be a generative image inpainting network. In some implementations, the system can also take the rendered object mask as additional input. The post-composition synthesis may further include data augmentation, including random occlusion, color jittering, as well as random contrast and saturation to mimic the differences among real-world images.

The network can be trained using images with instance segmentation masks inferred by the network in the target scene for the object. The training may include two loss functions: a perceptual loss and a GAN loss. The perceptual loss may be used to ensure the generated output's fidelity. The GAN loss may be used to boost the realism of the inpainted region as well as the lighting consistency.

FIG. 8 depicts one possible implementation of the training system for the object reconstruction system. In some implementations the object reconstruction system may be used to build an object bank.

In this implementation, the image data 802, or first set of object data, is processed by a first embedding model to generate a first feature embedding. In some implementations, the first embedding model may include a U-Net architecture. In this implementation, the LiDAR point cloud data 804, or second set of object data, is processed by a second embedding model to generate a second feature embedding. In some implementations, the second embedding model may include a PointNet architecture. The first feature embeddings may be aggregated through a max pooling operation and concatenated with the pooled second feature embedding.

The concatenated feature embeddings can then be processed by a multi-layer perceptron 806 to generate a third feature embedding. The third feature embedding may include a 3D mesh 810. The third feature embedding may be processed to generate prediction data 808 for training the system. The prediction data may then be used to render predicted image data. In some implementations, the prediction data 808 may also be used to generate predicted LiDAR data.

The system may then evaluate a loss function by comparing the predicted image data and predicted LiDAR data against the original image data 802 and the original LiDAR data 804. The loss function may include a silhouette loss 814, a LiDAR loss 812, and a regularization loss. The silhouette loss 814 may compare the predicted image data and the original image data 802 (e.g., may compare respective segmentation masks generated therefrom). The LiDAR loss 812 may compare the predicted LiDAR data and the original LiDAR data 804. In some implementations, the regularization loss involves several penalization terms for aiding in realistic object reconstruction.

The evaluation of the loss function may be used to modify the parameters of the first embedding model, the second embedding model, and/or the third embedding model. Once the system is trained, the system may be used to compile 3D assets 816 to aid in generating photorealistic image simulations.

Figure 9:
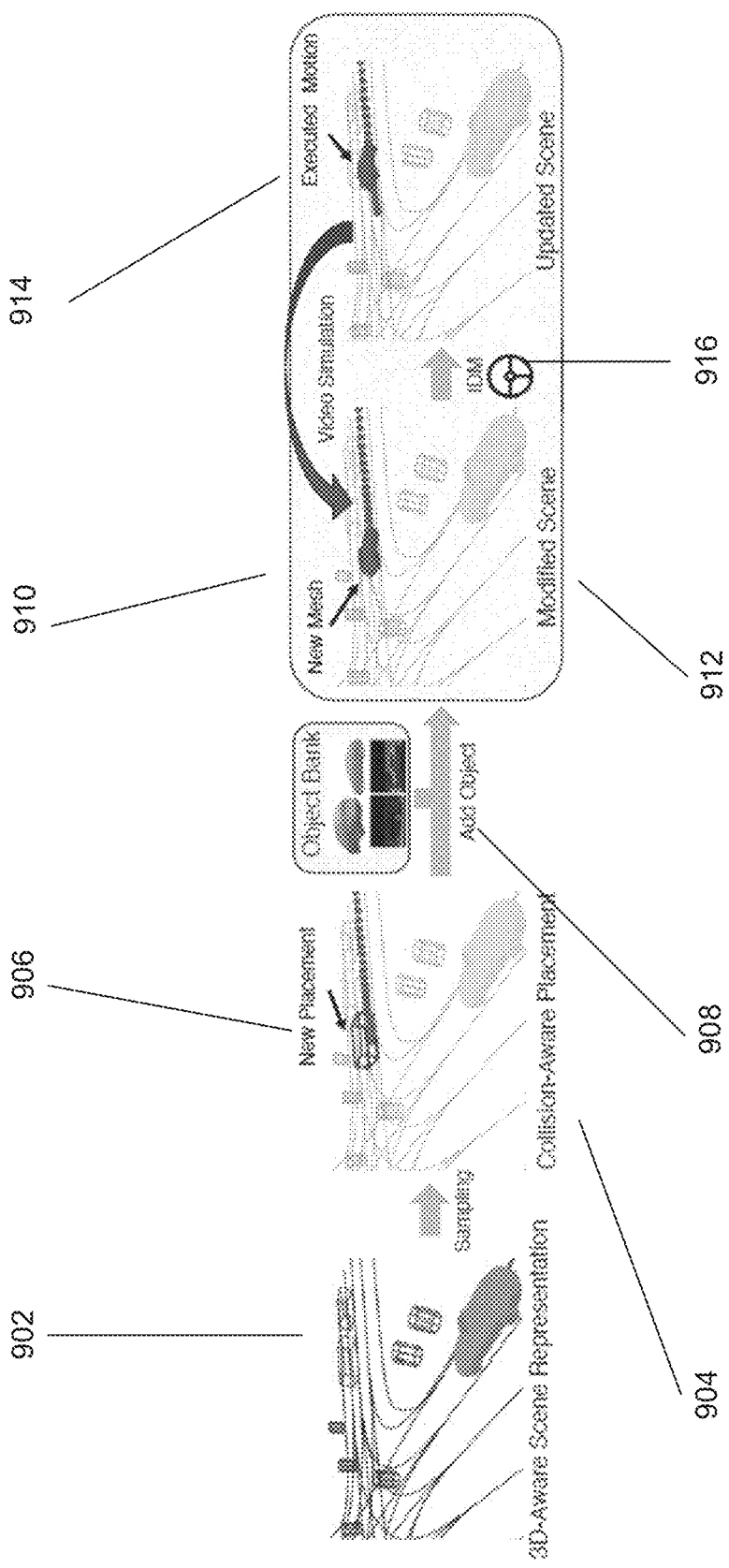
FIG. 9 depicts a graphical diagram of an example process to select an initial location for an object according to example embodiments of the present disclosure.

FIG. 9 depicts one possible implementation of the system's insertion location determination and object data selection steps. In this implementation, the insertion location determination step includes sampling locations 902 in the environment to determine where the insertion location 906 is going to be. The system can sample the locations and determine whether the locations are viable locations for an object to be placed. The location needs to meet the dynamics of the environment without leading to a collision. In this implementation, the system is aware of the movement of objects in the scene 902, and once a sampling location 906 is determined, the system determines whether the placement leads to a collision 904.

When an insertion location is finally determined to be a viable location for placement that does not lead to a collision, an object data set can be selected. The system may take data sets from an object bank 908 to process for selection. In this implementation, the data sets are scored on their viewpoint and depth overlap with the determined insertion location's viewpoint 912 and depths. The data sets with the largest overlap may be further filtered through a collision check. In some implementations, the data set with the greatest overlap in viewpoint and depth that does not lead to a collision may be selected as the insertion object data set 910.

In this implementation, once the insertion location is determined and the object data is selected, the system may process the insertion location, object data, and environment data with an intelligent driver model 916 fitted to a kinematics model to determine how the inserted object is going to interact in the environment 914.

FIG. 10 depicts an example input and output of one implementation of the system. In this implementation, the input is an input video 1002, captured while a car is driving down the street. The output is an output simulated video 1006 that includes a new car 1008 in the input video 1002. In this embodiment, the output is photorealistic 1012, physically plausible 1014, and geometrically consistent 1016. The photorealistic, physically plausible, and geometrically consistent output may have been generated through the use of the method of FIG. 3 or another method or system disclosed herein.

Figure 11:
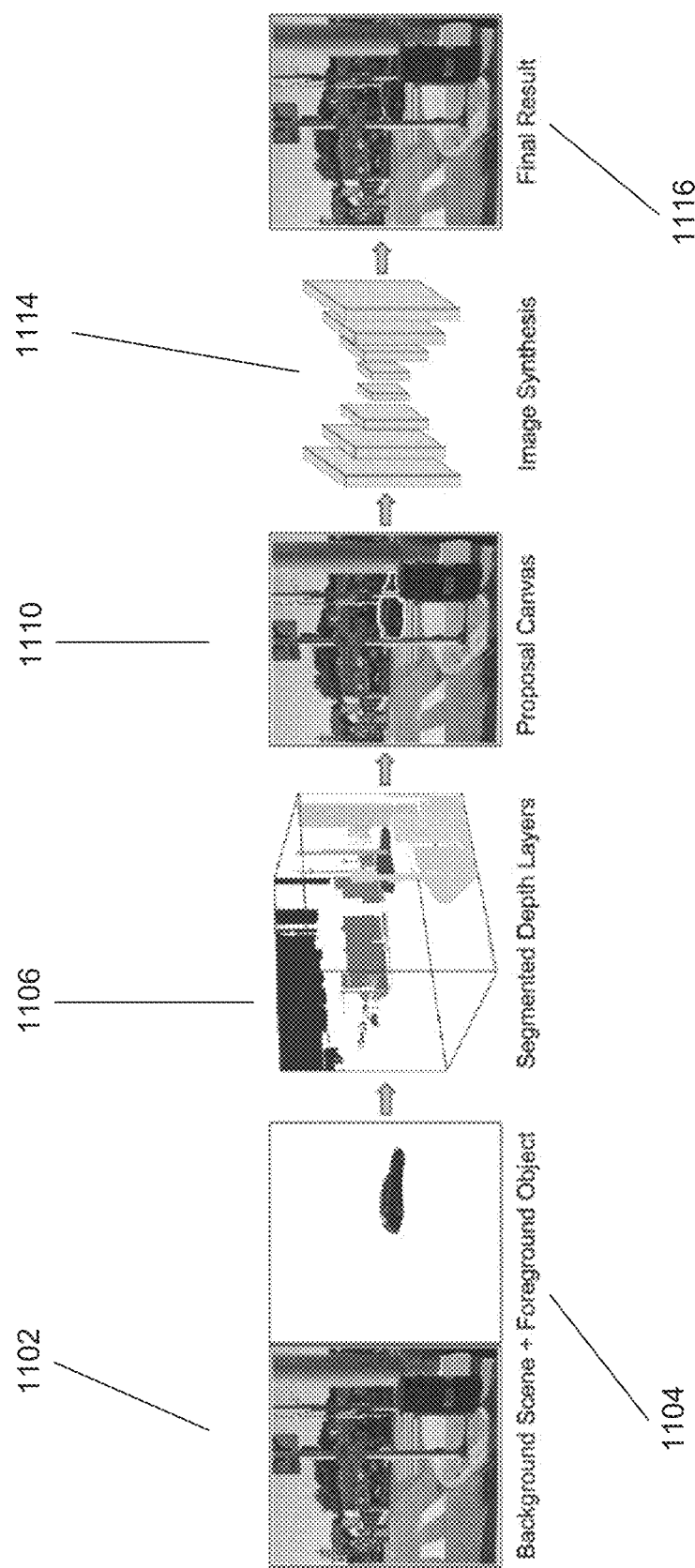
FIG. 11 depicts a graphical diagram of an example process to generate a simulation image according to example embodiments of the present disclosure.

FIG. 11 depicts an example implementation of the system. In this implementation, the insertion location 1102 has been determined, and the object data 1104 has been selected. In response to receiving the insertion location and the object data, the system generates occlusion data 1106. In this implementation, the system has determined the depths of different features in the environment to generate occlusion mask layers 1106 (i.e. segmented depth layers). The depth of the object data may also be determined before the object is inserted into the environment. When the object is inserted into the environment to generate an augmented image 1110, the occlusion data is used to determine what features appear in front of or behind the object.

In this implementation, the augmented image 1110 is then processed by an image synthesis model 1114, or a refinement model, to generate a refined augmented image 1116 with corrected texture and lighting. In this implementation, the image synthesis 1114 included texture synthesis for the border between the inserted object and the environment in order to create a smooth transition and a more realistic look.

ADDITIONAL DISCLOSURE

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method, comprising:
   obtaining one or more real world images collected by one or more real world sensors of a first vehicle during operation of the first vehicle, wherein the one or more real world images depict an environment at which the first vehicle is located;
   generating a depth map of the environment that describes respective depths of objects of the environment;
   identifying one or more first objects of the objects of the environment, based at least in part on the depth map, that would occlude a simulated object at an insertion location within the environment;
   augmenting at least one of the one or more real world images of the environment to generate an initial augmented image that depicts the simulated object at the insertion location and occluded by the one or more first objects of the environment;
   refining the initial augmented image with a machine-learned refinement model to generate a refined augmented image, wherein the machine-learned refinement model processes the initial augmented image to add one or more of texture correction, color correction, or contrast correction to a border between the at least one of the one or more real world images and the simulated object;
   generating simulation data based at least in part on the refined augmented image that depicts the simulated object, wherein the simulated object is generated in the refined augmented image at least in part by selecting an object and a source texture to represent the simulated object from an object bank based on a point of view and distance relative to the simulated object from the first vehicle; and
   executing, based on the simulation data, a simulation for autonomous vehicle software;
   wherein the simulation data comprises road data to test performance features for the autonomous vehicle software during the simulation.

2. The computer-implemented method of claim 1, wherein the simulation data comprises video simulation data across multiple camera sensors.

3. The computer-implemented method of claim 2, wherein the simulation data comprises synthetic labeled data for three-dimensional detection.

4. The computer-implemented method of claim 1, wherein the objects of the environment comprise one or more moving or non-moving objects in the environment.

5. The computer-implemented method of claim 1, wherein the identifying the one or more first objects is further based at least in part on a comparison of the respective depths of the objects of the environment to a rendered depth associated with the simulated object at the insertion location.

6. The computer-implemented method of claim 1, further comprising rendering one or more occlusion masks for the objects of the environment by evaluating depths of the environment and depths of the simulated object on a per pixel basis, wherein the one or more occlusion masks are used to generate the initial augmented image.

7. The computer-implemented method of claim 1, further comprising:
   comparing the respective depths of the objects of the environment to a rendered depth associated with the simulated object at the insertion location within the environment to identify one or more second objects of the environment that the simulated object would occlude at the insertion location; and
   wherein the initial augmented image depicts the simulated object at the insertion location, the simulated object occluding the one or more second objects of the environment.

8. A computing system for generation of synthetic imagery, the computing system comprising:
   one or more processors; and
   one or more non-transitory computer-readable media that store instructions for execution by the one or more processors that cause the computing system to perform operations, the operations comprising:
      obtaining environment data descriptive of an environment of a vehicle, wherein the environment data comprises one or more images of the environment;
      generating a depth map of the environment that describes respective depths of objects of the environment;
      identifying one or more first objects of the objects of the environment, based at least in part on the depth map, that would occlude a simulated object at an insertion location within the environment;
   augmenting at least one of the one or more images of the environment to generate an initial augmented image that depicts the simulated object at the insertion location and occluded by the one or more first objects of the environment;
   refining the initial augmented image with a machine-learned refinement model to generate a refined augmented image, wherein the machine-learned refinement model processes the initial augmented image to add one or more of texture correction, color correction, or contrast correction to a border between the at least one of the one or more images and the simulated object;

generating simulation data based at least in part on the refined augmented image that depicts the simulated object, wherein the simulated object is generated in the refined augmented image at least in part by selecting an object and a source texture to represent the simulated object from an object bank based on a point of view and distance relative to the simulated object from the vehicle; and executing, based on the simulation data, a simulation for autonomous vehicle software;

wherein the simulation data comprises road data to test performance features for the autonomous vehicle software during the simulation.

9. The computing system of claim 8, the operations further comprising rendering one or more occlusion masks for the objects of the environment by evaluating depths of the environment and depths of the simulated object on a per pixel basis, wherein the one or more occlusion masks are used to generate the initial augmented image.

10. The computing system of claim 8, wherein:
the one or more images comprise a Light Detection and Ranging (LiDAR) point cloud data; and
the operations comprise: projecting the LiDAR point cloud data onto the at least one of the one or more images; and interpolating LiDAR point cloud depths to obtain the depth map of the environment for the at least one of the one or more images.

11. One or more non-transitory computer-readable media that store instructions for execution by a computing system that cause the computing system to perform operations for generating synthetic imagery, the operations comprising:
obtaining one or more real world images collected by one or more real world sensors of a first vehicle during operation of the first vehicle, wherein the one or more real world images depict an environment at which the first vehicle is located;
determining an insertion location for a simulated vehicle within the environment;
identifying one or more first objects of the environment that would occlude the simulated vehicle at the insertion location;
augmenting at least one of the one or more real world images of the environment to generate an initial augmented image that depicts the simulated vehicle at the insertion location and occluded by the one or more first objects of the environment;

refining the initial augmented image with a machine-learned refinement model to generate a refined augmented image, wherein the machine-learned refinement model processes the initial augmented image to add one or more of texture correction, color correction, or contrast correction to a border between the at least one of the one or more real world images and the simulated vehicle;

generating simulation data based at least in part on the refined augmented image that depicts the simulated vehicle, wherein the simulated vehicle is generated in the refined augmented image at least in part by selecting an object and a source texture to represent the simulated vehicle from an object bank based on a point of view and distance relative to the simulated vehicle from the first vehicle; and executing, based on the simulation data, a simulation for autonomous vehicle software;

wherein the simulation data comprises road data to test performance features for the autonomous vehicle software during the simulation.

12. The one or more non-transitory computer-readable media of claim 11, wherein the identifying the one or more first objects is based at least in part on a comparison of respective depths of the first objects of the environment to a rendered depth associated with the simulated vehicle at the insertion location.

13. The one or more non-transitory computer-readable media of claim 11, the operations further comprising rendering one or more occlusion masks for the first objects of the environment by evaluating depths of the environment and depths of the simulated vehicle on a per pixel basis, wherein the one or more occlusion masks are used to generate the initial augmented image.

14. The one or more non-transitory computer-readable media of claim 11, wherein:
the one or more real world images comprise a Light Detection and Ranging (LiDAR) point cloud data; and
the operations comprise: projecting the LiDAR point cloud data onto the at least one of the one or more real world images; and interpolating LiDAR point cloud depths to obtain a depth map of the environment for the at least one of the one or more real world images.

* * * * *